US012066113B2

United States Patent
Yeung et al.

(10) Patent No.: US 12,066,113 B2
(45) Date of Patent: Aug. 20, 2024

(54) LINER FOR FRAC PUMP SUCTION MANIFOLD

(71) Applicant: BJ Energy Solutions, LLC, Houston, TX (US)

(72) Inventors: Tony Yeung, Tomball, TX (US); John Len Sudderth, Casper, WY (US)

(73) Assignee: BJ Energy Solutions, LLC, Houston, TX (US)

( * ) Notice: Subject to any disclaimer, the term of this patent is extended or adjusted under 35 U.S.C. 154(b) by 1402 days.

(21) Appl. No.: 16/535,131

(22) Filed: Aug. 8, 2019

(65) Prior Publication Data

US 2019/0360599 A1   Nov. 28, 2019

Related U.S. Application Data

(62) Division of application No. 16/026,236, filed on Jul. 3, 2018, now Pat. No. 11,085,544.

(Continued)

(51) Int. Cl.
*F16K 1/42* (2006.01)
*E21B 43/26* (2006.01)
(Continued)

(52) U.S. Cl.
CPC ............ *F16K 1/42* (2013.01); *E21B 43/2607* (2020.05); *F04B 1/0452* (2013.01); *F04B 1/053* (2013.01); *F04B 1/0538* (2013.01); *F04B 9/045* (2013.01); *F04B 47/04* (2013.01); *F04B 53/10* (2013.01); *F04B 53/1025* (2013.01);

(Continued)

(58) Field of Classification Search
CPC ........ E21B 43/26; F04B 19/22; F04B 1/0452; F04B 1/053; F04B 1/0538; F04B 47/04; F04B 53/10; F04B 53/1025; F04B 53/16; F04B 9/045; F16K 1/36; F16K 1/42; F16K 1/422

See application file for complete search history.

(56) References Cited

U.S. PATENT DOCUMENTS

| 664,146 A ‡ | 12/1900 | Hackett ................... F16K 15/06 |
| | | 137/533.25 |
| 1,707,017 A ‡ | 3/1929 | Kibele ................ F04B 53/1025 |
| | | 137/543.23 |

(Continued)

OTHER PUBLICATIONS

Mattco, *WR Mattco Reciprocating Pump Pulsation Control Equipment* (Rev. Apr. 2015).

(Continued)

*Primary Examiner* — Grant Moubry
*Assistant Examiner* — Ruben Picon-Feliciano
(74) *Attorney, Agent, or Firm* — Keith B. Willhelm

(57) ABSTRACT

Frac pumps have liners for a suction manifold that is adapted to provide fluid to a plurality of intake ports of a multi-unit reciprocating pump. The liners comprise a compressible, resilient body. The compressible, resilient body is carried within the suction manifold. When installed in the suction manifold, the body defines a channel extending through the manifold that is adapted to convey fluid from an inlet of the suction manifold to the intake ports of the pump units. The cross-sectional area of the channel diminishes along the direction of flow through the channel.

20 Claims, 37 Drawing Sheets

Related U.S. Application Data

(60) Provisional application No. 62/530,587, filed on Jul. 10, 2017.

(51) Int. Cl.

| | | |
|---|---|---|
| *F04B 1/0452* | (2020.01) | |
| *F04B 1/053* | (2020.01) | |
| *F04B 1/0538* | (2020.01) | |
| *F04B 9/04* | (2006.01) | |
| *F04B 19/22* | (2006.01) | |
| *F04B 47/04* | (2006.01) | |
| *F04B 53/10* | (2006.01) | |
| *F04B 53/16* | (2006.01) | |
| *F16K 1/36* | (2006.01) | |

(52) U.S. Cl.
CPC ............... *F04B 53/16* (2013.01); *F16K 1/36* (2013.01); *F16K 1/422* (2013.01); *F04B 19/22* (2013.01)

(56) References Cited

U.S. PATENT DOCUMENTS

| | | | | |
|---|---|---|---|---|
| 1,725,297 | A ‡ | 8/1929 | Paterson | F04B 53/1027 137/516.29 |
| 1,811,166 | A ‡ | 6/1931 | Yardley | F16K 15/063 137/543.13 |
| 2,018,288 | A ‡ | 10/1935 | Hall | F04B 53/1027 251/175 |
| 2,107,200 | A ‡ | 2/1938 | Kennon | F16K 15/02 251/332 |
| 2,260,381 | A ‡ | 10/1941 | Kennon | F16K 15/02 137/516.29 |
| 2,792,016 | A ‡ | 5/1957 | Shellman | F16K 1/46 137/516.29 |
| 2,898,082 | A ‡ | 8/1959 | Von Almen | F04B 53/1027 251/333 |
| 3,070,120 | A ‡ | 12/1962 | Wendt | F16K 1/46 137/516.29 |
| 3,510,103 | A ‡ | 5/1970 | Carsello | F16K 1/465 251/333 |
| 4,487,222 | A ‡ | 12/1984 | Crawford | F16K 1/38 137/516.29 |
| 4,861,241 | A ‡ | 8/1989 | Gamboa | F04B 53/1027 417/454 |
| 5,052,435 | A ‡ | 10/1991 | Crudup | F16K 15/063 137/516.29 |
| 5,275,204 | A ‡ | 1/1994 | Rogers | F04B 53/1027 137/516.29 |
| 6,701,955 | B2 ‡ | 3/2004 | McIntire | F04B 47/00 137/516.29 |
| 7,621,728 | B2 ‡ | 11/2009 | Miller | F04B 53/16 417/45 |
| 8,037,897 | B2 ‡ | 10/2011 | McIntire | F04B 53/102 137/516.29 |
| 8,444,398 | B2 ‡ | 5/2013 | Brunet | F04B 47/02 417/454 |
| 8,784,081 | B1 ‡ | 7/2014 | Blume | F04B 53/16 417/55 |
| 9,435,454 | B2 ‡ | 9/2016 | Blume | F16K 1/42 |
| 9,441,776 | B2 | 9/2016 | Byrne et al. | |
| 9,500,195 | B2 ‡ | 11/2016 | Blume | F04B 53/10 |
| 2011/0206546 | A1 * | 8/2011 | Vicars | F04B 53/007 417/559 |
| 2013/0020521 | A1 ‡ | 1/2013 | Byrne | F16K 1/385 251/334 |
| 2013/0068092 | A1 * | 3/2013 | Marette | F16J 13/00 92/169.2 |
| 2014/0130887 | A1 * | 5/2014 | Byrne | F04B 53/001 137/15.01 |
| 2014/0260954 | A1 ‡ | 9/2014 | Young | F04B 53/168 92/169 |
| 2014/0322050 | A1 * | 10/2014 | Marette | F04B 49/22 417/437 |
| 2015/0260177 | A1 ‡ | 9/2015 | Deel | F04B 37/12 251/333 |
| 2016/0215588 | A1 ‡ | 7/2016 | Belshan | F16K 31/12 |
| 2016/0369926 | A1 * | 12/2016 | Shuck | F04B 53/16 |
| 2017/0342976 | A1 ‡ | 11/2017 | Nagaraja Reddy | E21B 43/16 |

OTHER PUBLICATIONS

*Examiner's Requisition*, mailed Dec. 11, 2020, in CA Ser. No. 3,056,520.

\* cited by examiner
‡ imported from a related application

LINER FOR FRAC PUMP SUCTION MANIFOLD

FIELD OF THE INVENTION

The present invention relates in general to high pressure, high volume reciprocating pumps used in the oil and gas industry to fracture or "frac" a formation, and in particular, to improved designs for the fluid ends of such pumps.

BACKGROUND OF THE INVENTION

Hydrocarbons, such as oil and gas, may be recovered from various types of subsurface geological formations. The formations typically consist of a porous layer, such as limestone and sands, overlaid by a nonporous layer. Hydrocarbons cannot rise through the nonporous layer. Thus, the porous layer forms a reservoir, that is, a volume in which hydrocarbons accumulate. A well is drilled through the earth until the hydrocarbon bearing formation is reached. Hydrocarbons then can flow from the porous formation into the well.

In what is perhaps the most basic form of rotary drilling methods, a drill bit is attached to a series of pipe sections referred to as a drill string. The drill string is suspended from a derrick and rotated by a motor in the derrick. A drilling fluid or "mud" is pumped down the drill string, through the bit, and into the well bore. This fluid serves to lubricate the bit and carry cuttings from the drilling process back to the surface. As the drilling progresses downward, the drill string is extended by adding more pipe sections.

A modern oil well typically includes a number of tubes extending wholly or partially within other tubes. That is, a well is first drilled to a certain depth. Larger diameter pipes, or casings, are placed in the well and cemented in place to prevent the sides of the borehole from caving in. After the initial section has been drilled, cased, and cemented, drilling will proceed with a somewhat smaller well bore. The smaller bore is lined with somewhat smaller pipes or "liners." The liner is suspended from the original or "host" casing by an anchor or "hanger." A well may include a series of smaller liners, and may extend for many thousands of feet, commonly up to and over 25,000 feet.

Hydrocarbons, however, are not always able to flow easily from a formation to a well. Some subsurface formations, such as sandstone, are very porous. Hydrocarbons can flow easily from the formation into a well. Other formations, however, such as shale rock, limestone, and coal beds, are only minimally porous. The formation may contain large it quantities of hydrocarbons, but production through a conventional well may not be commercially practical because hydrocarbons flow though the formation and collect in the well at very low rates. The industry, therefore, relies on various techniques for improving the well and stimulating production from formations. In particular, various techniques are available for increasing production from formations which are relatively nonporous.

Perhaps the most important stimulation technique is the combination of horizontal well bores and hydraulic fracturing. A well will be drilled vertically until it approaches a formation. It then will be diverted, and drilled in a more or less horizontal direction, so that the borehole extends along the formation instead of passing through it. More of the formation is exposed to the borehole, and the average distance hydrocarbons must flow to reach the well is decreased. Fractures then are created in the formation which will allow hydrocarbons to flow more easily from the formation.

Fracturing a formation is accomplished by pumping fluid, most commonly water, into the well at high pressure and flow rates. Proppants, such as grains of sand, ceramic or other particulates, usually are added to the fluid along with gelling agents to create a slurry. The slurry is forced into the formation at rates faster than can be accepted by the existing pores, fractures, faults, vugs, caverns, or other spaces within the formation. Pressure builds rapidly to the point where the formation fails and begins to fracture. Continued pumping of fluid into the formation will tend to cause the initial fractures to widen and extend further away from the well bore, creating flow paths to the well. The proppant serves to prevent fractures from closing when pumping is stopped.

A formation rarely will be fractured all at once. It typically will be fractured in many different locations or zones and in many different stages. Fluids will be pumped into the well to fracture the formation in a first zone. After the initial zone is fractured, pumping is stopped, and a plug is installed in the liner at a point above the fractured zone. Pumping is resumed, and fluids are pumped into the well to fracture the formation in a second zone located above the plug. That process is repeated for zones further up the formation until the formation has been completely fractured.

The harsh operating conditions and frequent servicing means that the typical fracturing operation rarely relies on a single pump. It is important that the operation continue uninterrupted once it has been initiated. If there is a significant pressure drop before the required volume of proppant has been injected into a formation, the formation will tend to relax and close the fractures. Operators, therefore, typically use an array of frac pumps connected in parallel to a common flow line. The array provides excess capacity so that, if necessary, individual pumps may be taken off-line for repair or service without having to stop the overall operation. That excess capacity, however, has its own cost, which can be reduced only to the extent that the likelihood of any individual pump failing or requiring service during the frac operation is reduced.

Frac pumps used in the oil and gas industry are of the type referred to as reciprocating plunger pumps. They typically incorporate a number of synchronized and manifolded pumping units, usually three (a "triplex" pump) or five (a "quintiplex" pump). Each pumping unit has a plunger that moves linearly back and forth in a cylinder, traveling in and out of a pump chamber. The pump chamber communicates with an intake or "suction" port and a discharge port. Each port has a one-way valve. Fluid enters the chamber through the intake port as the plunger withdraws from the chamber. It is pumped out of the chamber through the discharge port as the plunger enters the chamber.

The plungers are part of what is generally referred to as the "fluid end" of the pump. They are driven by what is commonly referred to as the "power end" of the pump. The power end includes a rotating crankshaft that typically is powered by a diesel engine. The rotation of the crankshaft is converted to linear motion by a number of crosshead assemblies, each of which are connected, either directly or through connecting "pony" rods, to a corresponding plunger.

The major component of the fluid end is the pump housing or block. In frac pumps, the fluid end block is typically a single, unitary component, and it defines the pump cavity for each pumping unit in the pump. That is, the cylinders in which the plungers travel, the ports in which the valves are mounted, any access bores, and the pump chambers for all pump units are defined by the fluid end block.

The forces generated within, and the conditions under which modern frac pumps operate can fairly be described as extreme. Frac pumps typically generate at least 1,800, and up to 3,000 or more horsepower. They operate at fluid pressures up to 18,000 pounds per square inch (psi) or more. Each piston is cycling at 2 to 3 times a second, thus creating a variety of cyclic, extremely high forces generated from both the power end driving the plungers and from the fluid passing through the block. Those forces cycle through the block and the rest of the pump along numerous vectors. Such forces, over time, induce cracking, both visible and microscopic, that can lead to failure. Cracking also can be exacerbated by the chemical action of fluids being pumped through the block. Moreover, the fluid passing through the pump is highly abrasive and often corrosive. The fluid end and other internal components of the pump may suffer relatively rapid material loss.

Frac jobs also can be quite extensive, both in terms of the pressures required to fracture a formation and the time required to complete all stages of an operation. Prior to horizontal drilling, a typical vertical well might require fracturing in only one, two or three zones at pressures usually well below 10,000 psi. Fracturing a horizontal well, however, may require fracturing in 20 or more zones. Horizontal wells in shale formations such as the Eagle Ford shale in South Texas typically require fracturing pressures of at least 9,000 psi and 6 to 8 hours or more of pumping. Horizontal wells in the Haynesville shale in northeast Texas and northwest Louisiana require pressures around 13,500 psi. Horizontal wells in the Permian basin may be fractured in up to 80 or 100 stages at pressures approaching 10,000 psi. Pumping may continue near continuously at flow rates of 2 to 3 thousand gallons per minute (gpm)—for several days before fracturing is complete.

Any failure of the pumps or other system components on site may interrupt fracturing, potentially reducing its effectiveness and inevitably increasing the amount of time required to complete the operation. Moreover, if a component such as a pump fails catastrophically, large quantities of fluid can be ejected at very high pressures, potentially injuring workers. Pumps and their various components must be certified and periodically inspected and recertified, but not all damage to or weakening of the components may be detected. Fatigue stress and microscopic fracturing is difficult to detect and can lead to catastrophic failure.

The statements in this section are intended to provide background information related to the invention disclosed and claimed herein. Such information may or may not constitute prior art. It will be appreciated from the foregoing, however, that there remains a need for new and improved high pressure pumps and methods for protecting high pressure pumps from excessive wear and tear. Such disadvantages and others inherent in the prior art are addressed by various aspects and embodiments of the subject invention.

SUMMARY OF TILE INVENTION

The subject invention, in its various aspects and embodiments, relates generally to high pressure, high volume reciprocating pumps, and especially to those used in the oil and gas industry to fracture a well. Broad embodiments of the invention are directed to improved inlet and discharge valves for such pumps and to pumps having the improved valves. One embodiment of the novel valves is directed to valves which have a seat and a valve body. A seat surface is provided on a seat insert which is threaded or otherwise removably mounted in the seat.

Other embodiments and aspects of the invention provide valve seats for a frac pump. The valve seat comprises a cylindrical body and an annular seat surface. The body has an axial passage and external threads adapted to engage internal threads in a fluid end block of the frac pump. The annular seat surface is at an end of the body and is adapted to engage a valve body of the frac pump.

Other embodiments provide valve seats where the seat surface has a first portion extending at a first angle and a second portion extending at a second angle, valve seats where the first portion is adapted to engage a metal valve surface on the valve body and the second portion is adapted to engage a compressible seal on the valve body, and valve seats where the first angle is steeper than the second angle.

Still other embodiments provide valve seats having an external chamfered annular surface above the external threads and valve seats having an external chamfered annular surface below the external threads. The chamfered surfaces are adapted to seal against a surface in a fluid end block of the frac pump.

Yet other embodiments provide valve assemblies, fluid ends for frac pumps, and frac pumps having such valve seats.

Other embodiments and aspects of the invention provide valve bodies for a frac pump. The valve bodies comprise a head and a compressible seal. The head provides a valve surface adapted to engage a valve seat in the frac pump. The compressible seal is carried on the head radially inward of the valve surface and is adapted to engage the valve seat.

Other embodiments provide valve bodies where the compressible seal is fabricated separately from the head and valve bodies where the compressible seal is fabricated from an elastomer.

Yet other embodiments provide valve bodies where the valve surface has a first angle and the compressible seal has a second angle and valve bodies where the first angle is steeper than the second angle.

Additional embodiments provide valve bodies where the face of the compressible seal is curved and valve bodies where the face of the compressible seal extends at an angle shallower that that of the mating portion of the valve seat.

Still other embodiments provide valve bodies where the valve body comprises legs attached to the head, valve bodies where the head and the legs are attached by a threaded connection, valve bodies where the head comprises a downwardly extending post and the compressible seal has an opening therein adapted to allow the compressible seal to be carried on the head around the post, and valve bodies where the legs are attached by a threaded connection with the post.

Other embodiments provide valve assemblies, fluid ends for frac pumps, and frac pumps having such valve bodies.

The invention includes other embodiments of the novel valves. Such valves have a seat and a valve body. The seat provides a seat surface, and the valve body provides a valve surface. The seat surface and valve surface have complementary, relatively steep angles greater than 45°, such as about 60°.

Still other embodiments of the novel valves include valves with a valve body. The valve body has a plurality of legs depending from a head of the body. The legs guide the valve body as it moves up and down. The legs also are tilted relative to the central axis of the valve. The legs thus serve as "vanes" to induce incremental rotation of the valve body by fluids passing through the valve as the valve opens and closes.

Other embodiments and aspects of the subject invention provide suction valve retainers for a frac pump. The suction valve retainers are adapted for installation within a suction valve cavity of the frac pump. They comprise a body and at least four arms. The body is adapted to engage a spring extending from a suction valve body of a frac pump. The arms have a bearing surface at their terminus adapted to bear on the valve cavity and confine the retainer within the valve cavity when the spring is under compression.

Other embodiments provide suction valve retainers were the bearing surfaces of the retainer arms bear on inwardly tapered walls of the valve cavity.

Still other embodiments provide suction valve retainers where the retainer body comprises a lug adapted to position the spring on the retainer body.

Yet other embodiments provide suction valve retainers where the arms provide first and second pairs of aligned bearing surfaces, retainers where the arms in the first and second pairs of aligned bearing surfaces are offset by about 15 to about 40°, and retainers where the bearing surfaces have a circular arc of from about 10 to about 15°. Additional embodiments provide suction valve retainers having an axial plane of symmetry.

Other embodiments provide suction valve assemblies, fluid ends for frac pumps, and frac pumps having such suction valve retainers.

Other embodiments and aspects of the subject invention provide plungers and suction plugs for frac pumps. The plungers comprise a cylindrical body adapted for mounting in a bore in a fluid end block of the frac pump. The plunger body has a connection end and a chamber end. The connection end is adapted for assembly to a reciprocating drive assembly of the frac pump. The chamber end has a domed terminus, such as a truncated sphere or a truncated ellipsoid.

The suction plugs comprise a cylindrical body adapted for mounting in a suction bore of a fluid end of the frac pump. The suction plug body has an external face and a chamber face. The external face is adapted to engage a plug cover. The chamber face has a domed terminus, such as truncated sphere or a truncated ellipsoid.

Other embodiments provide fluid ends for frac pumps and frac pumps having one or both of such plungers and suction plugs.

The invention also is directed generally to improved fluid end blocks for reciprocating pumps and to pumps incorporating such fluid end blocks. One embodiment of the novel fluid end blocks comprises inlet and discharge ports. The ports are provided with a ductile insert which is removably mounted within the ports, for example, by an interference fit. The seat of a valve may be interference fitted within the insert.

Other embodiments are directed to improved fluid end blocks that comprise improved packing assemblies. The packing assemblies comprise an insert in which the packing elements are carried. The insert is removably mounted into an enlarged portion of cylinders in the fluid end block, for example, by a threaded connection.

In other aspects and embodiments, the invention is directed to improved threaded bore covers for reciprocating pumps and to pumps that comprise the threaded covers. One embodiment of the threaded covers is an assembly of two threaded covers which is threaded into a single bore. The first cover serves to preload the threads of the second cover, thus reducing the likelihood that the cover assembly will loosen as the pump is operated.

Other embodiments of the novel threaded covers include self-cleaning threaded covers. The covers include a nylon insert carried within one of its threads. The insert will extend into and be compressed by the roots of mating threads. Thus, the insert serves to push debris out of the mating threads as the cover is threaded into the bore.

Other embodiments and aspects of the subject invention provide liners for a suction manifold that is adapted to provide fluid to a plurality of intake ports of a multi-unit reciprocating pump. The liners comprise a compressible, resilient body. The compressible, resilient body is carried within the suction manifold. When installed in the suction manifold, the body defines a channel extending through the manifold that is adapted to convey fluid from an inlet of the suction manifold to the intake ports of the pump units. The cross-sectional area of the channel diminishes along the direction of flow through the channel.

Other embodiments provide liners where the body is fabricated from a closed-cell foamed material and liners where the body is fabricated from a foamed nitrile butadiene rubber.

Still other embodiments provide liners where the body is generally cylindrical and the channel extends laterally along the length of the body and has an open top, liners where the depth of the channel diminishes along the direction of flow through the channel, and liners where the width of the channel diminishes along the direction of flow through the channel. Yet other embodiments provide liners where the body is generally cylindrical and the channel comprises a bore extending axially through the body and laterally spaced openings extending radially outward from the bore to the periphery of the body.

Additional embodiments provide suction manifolds for multi-unit reciprocating pumps having a plurality of intake ports that comprise the liners.

Still other embodiments provide multi-unit reciprocating pumps having a plurality of intake ports and a suction manifold adapted to provide fluid to the intake ports. The pumps comprise the novel liners installed in the manifold.

Additional embodiments provide multi-unit reciprocating pumps having a tapered shim installed a suction manifold. The tapered shim supports the compressible body under its distal end and is effective to provide the compressible body with the diminution of cross-sectional area.

Other embodiments and aspects of the subject invention provide suction manifolds that are adapted to provide fluid to a plurality of intake ports of a multi-unit reciprocating pump. The suction manifolds comprise an inlet, a liner, and a cap. The liner is carried with the manifold and comprises a compressible, resilient body. The compressible, resilient body defines a channel extending through the manifold that is adapted to convey fluid from the inlet of the manifold to the intake ports of the pump units. The cap is adapted for coupling to the inlet and to a suction line. The cap comprises a passage and a flow guide extending inwardly into the channel of the compressible body.

Other embodiments provide suction manifolds where the flow guide of the cap comprises a radial enlargement adapted to engage a portion of the compressible body.

Still other embodiments provide multi-unit reciprocating pumps having a plurality of intake ports. The pumps comprise the novel suction manifolds.

Finally, still other aspects and embodiments of the invention provide pumps which have various combinations of such features as will be apparent to workers in the art.

Thus, the present invention in its various aspects and embodiments comprises a combination of features and characteristics that are directed to overcoming various shortcomings of the prior art. The various features and characteristics described above, as well as other features and characteristics, will be readily apparent to those skilled in the art upon reading the following detailed description of the preferred embodiments and by reference to the appended drawings.

Since the description and drawings that follow are directed to particular embodiments, however, they shall not be understood as limiting the scope of the invention. They are included to provide a better understanding of the invention and the manner in which it may be practiced. The subject invention encompasses other embodiments consistent with the claims set forth herein.

Figure 1:
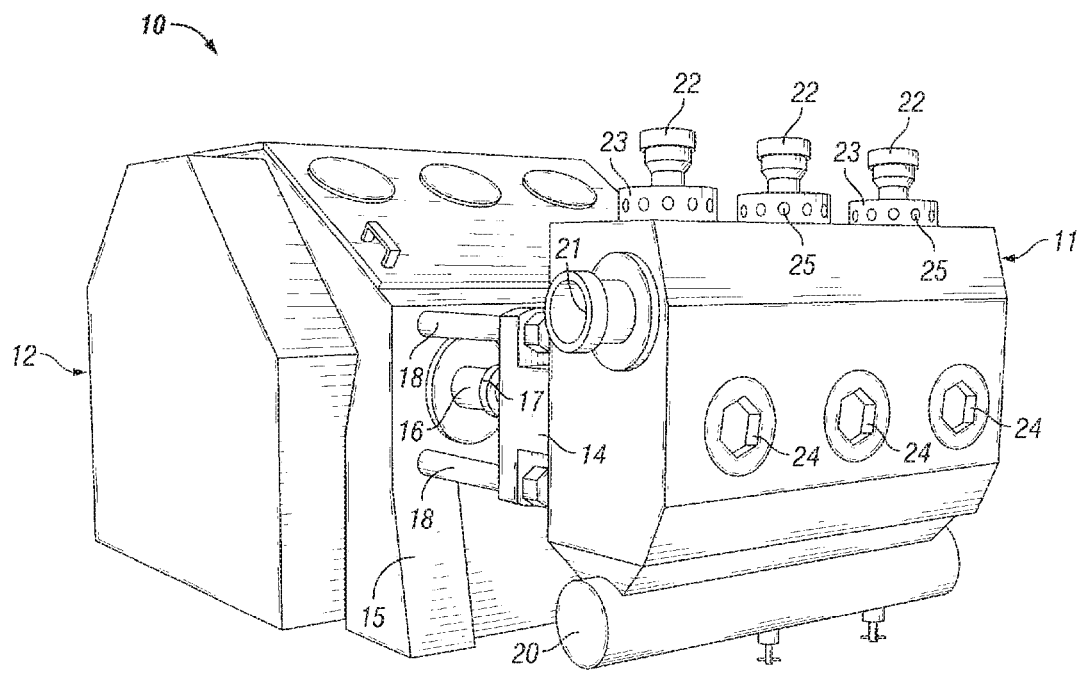
FIG. 1 (prior art) is a perspective view of a prior art frac pump 10 which is generally representative of prior art frac pumps in which the novel improvements may be incorporated.
Figure 2:
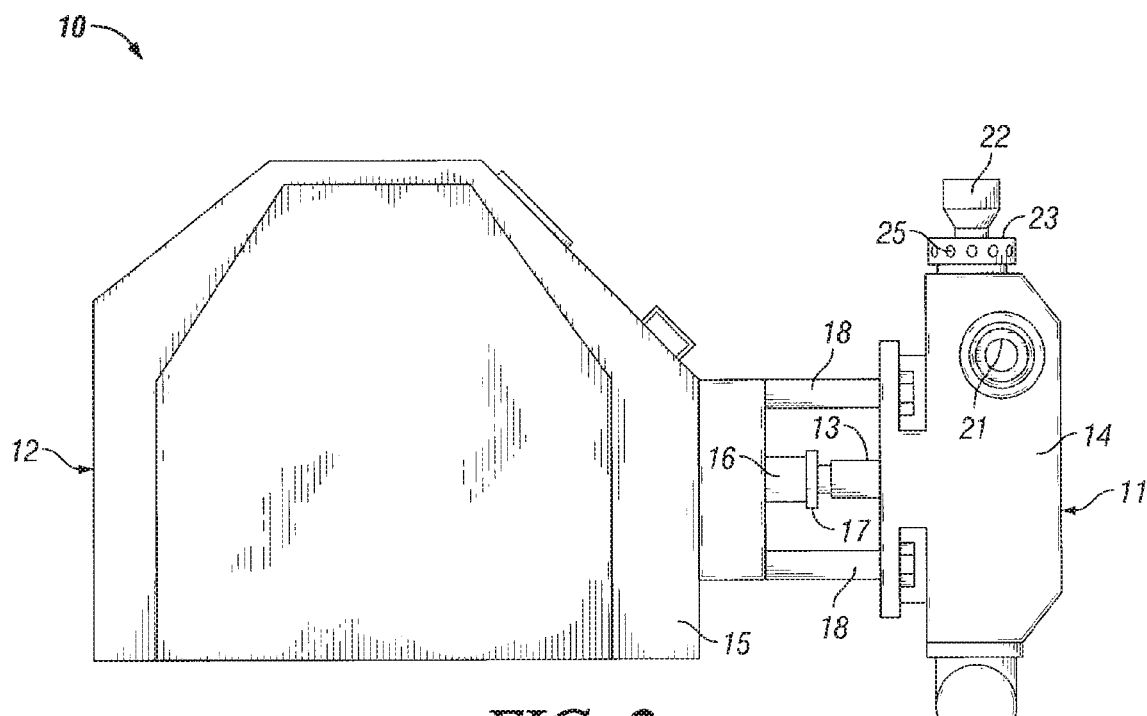
FIG. 2 (prior art) is a side elevational view of prior art pump 10 shown in 1.
Figure 3:
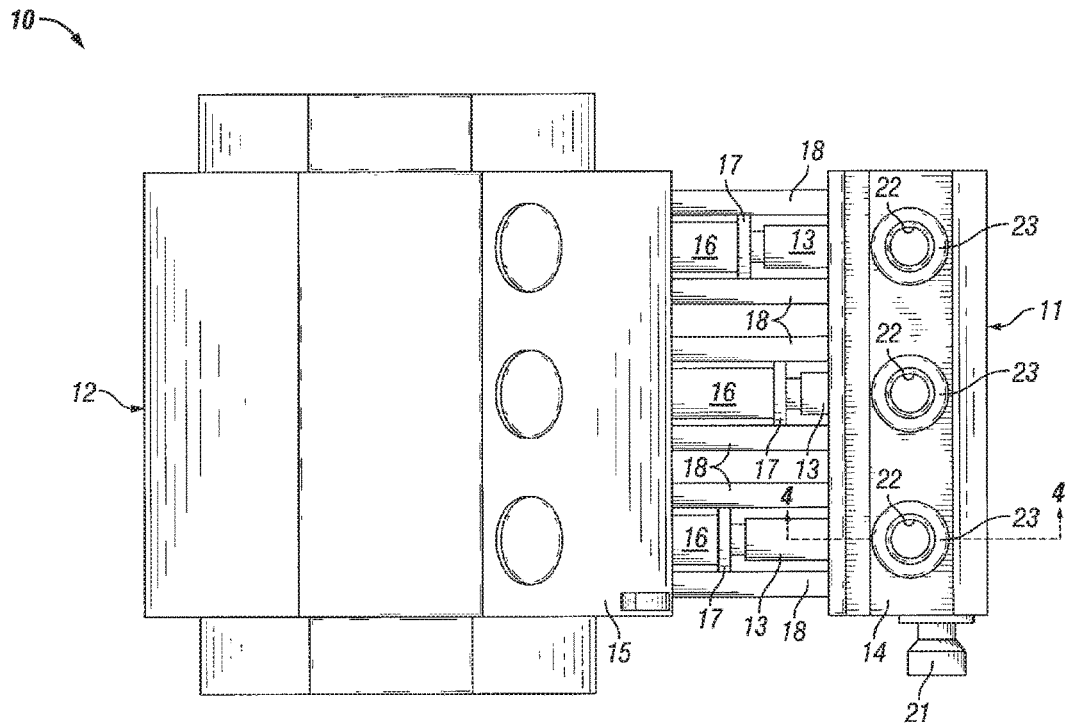
FIG. 3 (prior art) is a top plan view of prior art pump 10 shown in FIGS. 1 and 2.

In the drawings and description that follows, like parts are identified by the same reference numerals. The drawing figures are not necessarily to scale. Certain features of the embodiments may be shown exaggerated in scale or in somewhat schematic form and some details of conventional design and construction may not be shown in the interest of clarity and conciseness.

DESCRIPTION OF ILLUSTRATIVE EMBODIMENTS

The subject invention, in various aspects and embodiments, is directed generally to high pressure, high volume reciprocating pumps, such as those used in fracturing oil and gas wells, and in particular, to various aspects and features of the fluid end of such pumps. Specific embodiments will be described below. For the sake of conciseness, however, all features of an actual implementation may not be described or illustrated. In developing any actual implementation, as in any engineering or design project, numerous implementation-specific decisions must be made to achieve a developers' specific goals. Decisions usually will be made consistent within system-related and business-related constraints, and specific goals may vary from one implementation to another. Development efforts might be complex and time consuming and may involve many aspects of design, fabrication, and manufacture. Nevertheless, it should be appreciated that such development projects would be a routine effort for those of ordinary skill having the benefit of this disclosure.

The subject invention provides various improvements in the valves, seats, retainers, plungers, suction plugs, packings, closures, suction manifolds, and liners of common conventional high pressure, high power pumps that are used in fracturing operations in the oil and gas industry. Such frac pumps typically generate at least 1,800, and up to 3,000 or more horsepower. Common and conventional designs for such frac pumps may be described by reference to FIGS. 1-5 which show conventional frac pump 10. It is believed that the novel improvements may be easily incorporated by workers of ordinary skill in the art into such conventional pump designs through routine effort.

Figure 4:
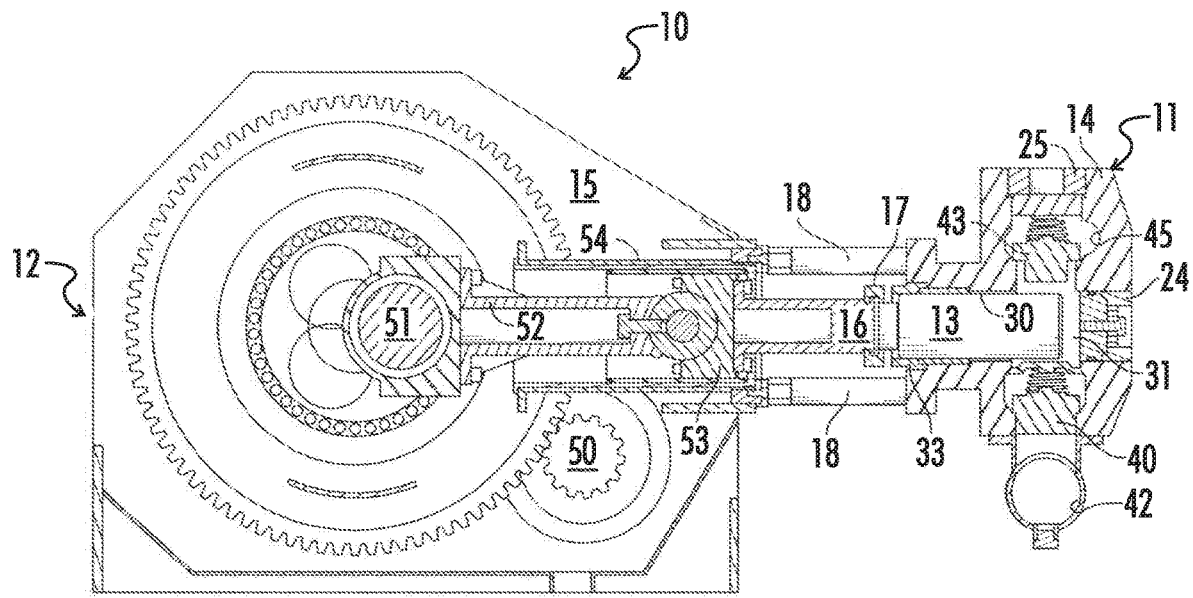
FIG. 4 (prior art) is a cross-sectional view, taken generally along line 4-4 of FIG. 3, of prior art pump 10 shown in FIGS. 1-3.
Figure 5:
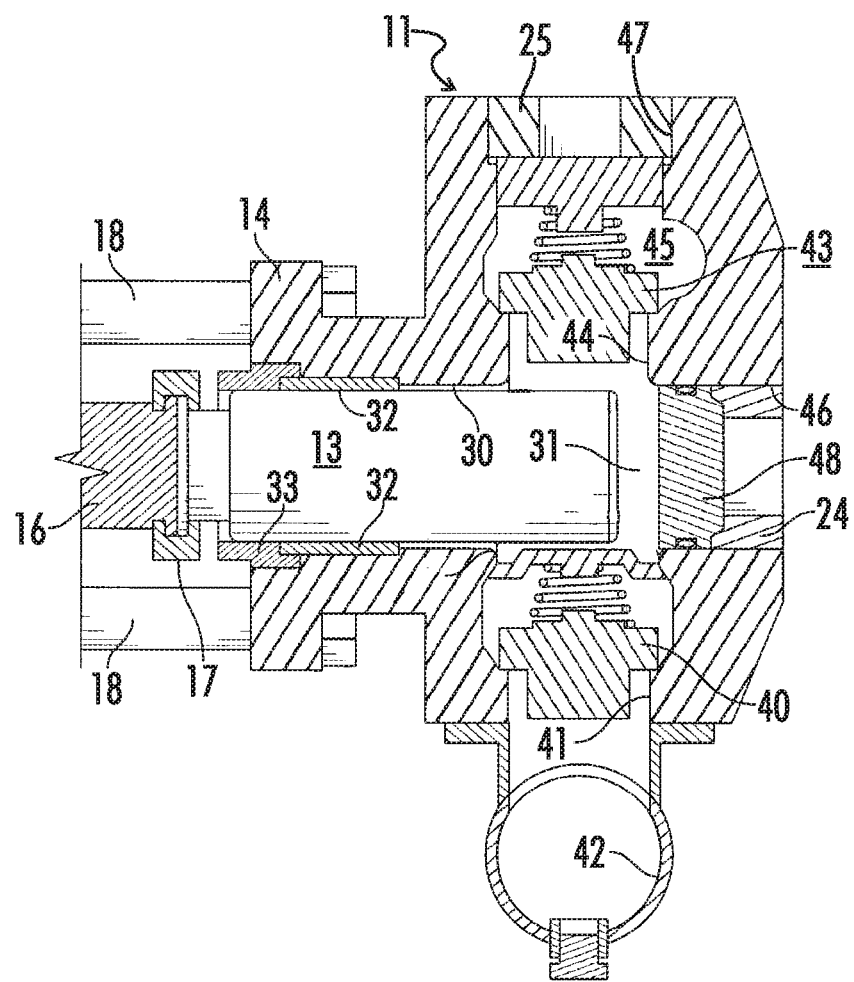
FIG. 5 (prior art) is a cross-sectional view of the fluid end 11 of pump 10 shown in FIGS. 1-4.

Frac pump 10 is a triplex pump. It has, in essence, three synchronized, manifolded reciprocating pumping units mounted in its so-called "fluid end" 11. The pumping units in fluid end 11 are all powered by a common so-called "power end" 12. The pumping units have essentially the same construction, one of which is shown in FIGS. 4-5. As shown therein, each pumping unit includes a reciprocating plunger 13 which is mounted in a cylinder 30. Cylinders 30 for all three plungers 13 are defined in a common housing or fluid end block 14 shown generally in FIGS. 1-5. Fluid end block 14, as is typical, is cast and milled from high strength steel as a single component. It is the major portion of fluid end 11 of pump 10. It not only defines cylinders 30 in which plungers 13 reciprocate, but also the other chambers and bores, and provides a base to which the other fluid end components are mounted directly or indirectly.

Power is supplied to plungers 13 via power end 12 of pump 10. Power end 12 is rigidly and securely connected to fluid end 11 via a plurality of stay rods 18 which extend between a power end housing 15 and fluid end block 14. Various covers (not shown) are provided in power end housing 15 to allow access to its inner components. It will be appreciated that power end 12 does not actually generate power. Instead, power is transmitted to power end 12 by an engine or motor, such a diesel engine (not shown).

Power from the engine's rotating drive shaft drives a gear mechanism 50 mounted in power end housing 15 as seen in FIG. 4. Gear mechanism 50 is operably connected to a crankshaft 51. Crankshaft 51 actuates separate drive mechanisms for each plunger 13. For example, a connecting rod 52 extends from crankshaft 51 to crosshead assembly 53. Crosshead assembly 53 is slidably mounted on a guide 54 which is mounted within power end housing 15. Thus, rotation of crankshaft 51 is converted to linear motion by crosshead assembly 53 and connecting rod 52. That is, crosshead assembly 53 will reciprocate linearly, i.e., slide back and forth in crosshead guide 54 as crankshaft 51 is rotated.

The crosshead assembly is operably connected, either directly or indirectly, to the plungers. For example, crosshead assembly 53 is connected to plunger 13 via pony rod 16, which in turn is connected to plunger 13 via connector 17. The reciprocating, linear motion of crosshead assembly 53, thus, is transmitted to plunger 13. It will be appreciated that the crosshead assemblies and other internal mechanisms in the power end of the other two pump units of pump 10 are substantially identical to the unit described above.

Fluid enters fluid end 11 of pump 10 through one of two inlets 20 (the other inlet 20 being capped during operation) and is pumped out through one of two outlets 21 (the other outlet 21 being capped). Access to internal components of fluid end 11 is provided via bores having threaded covers, such as suction covers 24 and valve covers 25 shown in FIGS. 4-5. One or more valve covers 25 may be replaced by stems, such as stems 22 shown in FIGS. 1-3, which are mounted on fluid end block 14 by threaded nuts 23. Stems 22 provide communication with fluid flowing out of pump outlet 21, and pressure or flow gages and the like (not shown) may be threaded into stems 22 to monitor pump operating conditions.

Each plunger 13, as may be seen in in FIGS. 4-5, reciprocates in a cylinder 30 defined in fluid end block 14. Plunger 13 is connected at its rear (left) end to pony rod 16 by connector 17. It should be noted that plunger 13 shown in FIGS. 4-5 is near the full extent of its pump stroke, at which point its forward (right) end extends well into a pump chamber 31. A packing 32 is loaded into a slightly enlarged, rear portion of cylinder 30 to provide a fluid tight seal between cylinder 30 and reciprocating plunger 13. Given that fluid flowing through pump 10 typically contains an abrasive proppant, packing 32 must be replaced frequently. Packing 32 is held in place, therefore, by a threaded, annular nut 33, commonly referred to as a gland nut, which screws into fluid end block 14.

Packing 32 typically incorporates a number of elastomeric, metallic, and/or composite components. Various lubrication channels usually are provided in packing 32, packing nut 33, and/or fluid end block 14 as well. Such features, however, are well known in the art and are not material to illustrating the subject invention and, therefore, are not shown in detail in FIGS. 4-5. Suffice it to say that packing 32 is subject to extreme wear and must be replaced periodically by, inter alia, removing packing nut 33.

Packing nut 33 is of conventional design. The body of packing nut 33 is generally cylindrical, its central aperture allowing plunger 13 to pass therethrough. Its inner end has threads on its outer circumference so that packing nut 33 may be threaded into fluid end block 14. The other, outer end of packing nut 33 is unthreaded, has a generally smooth exterior surface, and extends somewhat beyond the adjacent surface of fluid end block 14.

Referring again to FIGS. 4-5, pump chamber 31 has a spring-loaded, one-way intake valve 40 mounted in an intake port 41. Intake port 41 is in fluid communication with fluid inlet 20 of pump 10 via a manifolding chamber 42 (as are the intake ports 41 of the other pumping units). A spring is mounted on top of intake valve 40 and extends upward into engagement with a suction valve retainer 69. Retainer 69 has ends that conform to and are adapted to bear on the walls of a cavity on the suction side of pump chamber 31. It may be inserted at an angle into a suction valve cavity in the lower portion of the pump chamber and used to overcompress the spring. Retainer 69 then will be re oriented. Compression on the spring will be released somewhat so that the ends of retainer 69 bear on the walls of the cavity. Retainer 69 and intake valve 40 thus are both held in place by the compression spring.

A spring-loaded, one-way discharge valve 43 is mounted in a discharge port 44. Discharge port is in fluid communication with fluid outlet 21 of pump 10 via another manifolding chamber 45 (as are the discharge ports of the other pumping units). Thus, intake valve 40 will open, and fluid will be drawn into pump chamber 31 via pump inlet 20, manifolding chamber 42, and intake port 41 as plunger 13 withdraws from pump chamber 31. Discharge valve 43 then will open, and fluid will be pumped out of chamber 31, and thence through discharge port 44, manifolding chamber 45, and pump outlet 21, as plunger 13 enters chamber 31.

Given that fluid flowing through pump 10 often contains an abrasive proppant, valves 40 and 43 necessarily wear out and must be replaced frequently. Fluid end block 14, therefore, has a suction bore 46 associated with each pump chamber 31 that allows access to intake valve 40 and a valve bore 47 that allows access to discharge valve 43. A cylindrical plug (commonly referred to as a "suction valve cover") 48 is mounted in the inner portion of suction bore 46. Plug 48 is secured in place by threaded suction cover 24. Plug 48 prevents fluid from leaking out of pump chamber 31 through suction bore 46. Thus, valves 40 and 43 in pump chamber 31 may be replaced as needed by, inter alia, removing threaded suction covers 24 and valve covers 25.

Figure 6:
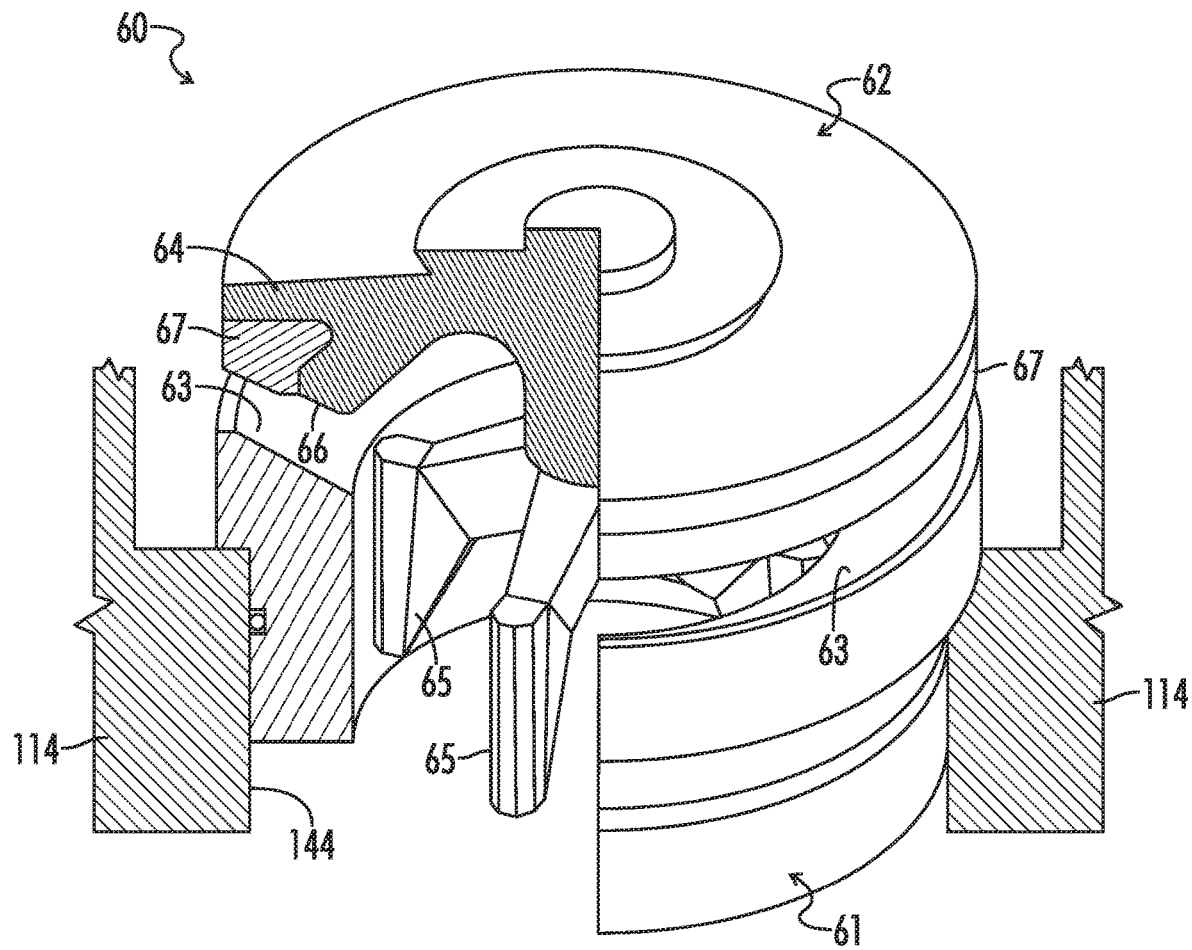
FIG. 6 (prior art) is an isometric view, with an axial quarter-section removed, of a prior art valve 60 that may be used in pumps of the general design of conventional pump 10 shown in FIGS. 1-5.

Various improvements to such conventional pump designs and, in particular, to the fluid ends of such pumps may be exemplified by first referring to FIG. 6. FIG. 6 shows in greater detail a conventional valve 60 of a type disclosed in U.S. Pat. No. 9,435,454 to G. Blume. Valve 60 may be used as an intake or a discharge valve in pumps such as pump 10. Valve 60 generally comprises a seat 61 and a valve body 62. Valve body 62 will move up and down within seat 61 to allow valve 60 to open and close. It will be noted, therefore, that valve 60 is shown in FIG. 6 in its open position.

Seat 61 has a generally annular configuration with an axial, cylindrical passage. It is mounted within, for example, discharge port 14 in fluid end block 14. A seal, typically an elastomeric O-ring, will be provided between seat 61 and fluid end block 14. Seat 61 has a seat surface 63 on its upper end which is generally chamfered at an angle of about 45°.

Valve body 62 has a generally disc shaped head 64 from which depend a plurality of legs 65. Legs 65 serve to guide valve body 62 within the passage of seat 61. Legs 65 are spaced and extend downward and radially outward from a central column which extends downward from head 64. Fluid thus can flow past legs 65 at the same time that legs 65 ensure that valve body 62 moves reliably up and down through seat 61. The central portion of head 64 is generally concave providing head 64 with an annular bottom surface. A flat valve surface 66 is provided on a radially inward portion of the bottom of head 64. Valve surface 66 extends at an angle complementary to the angle of seat surface 63 on seat 61, that is, at about 45°. A groove extends around the periphery of the bottom of head 64, radially outward of valve surface 66. An elastomeric seal 67 is carried therein.

Figure 7:
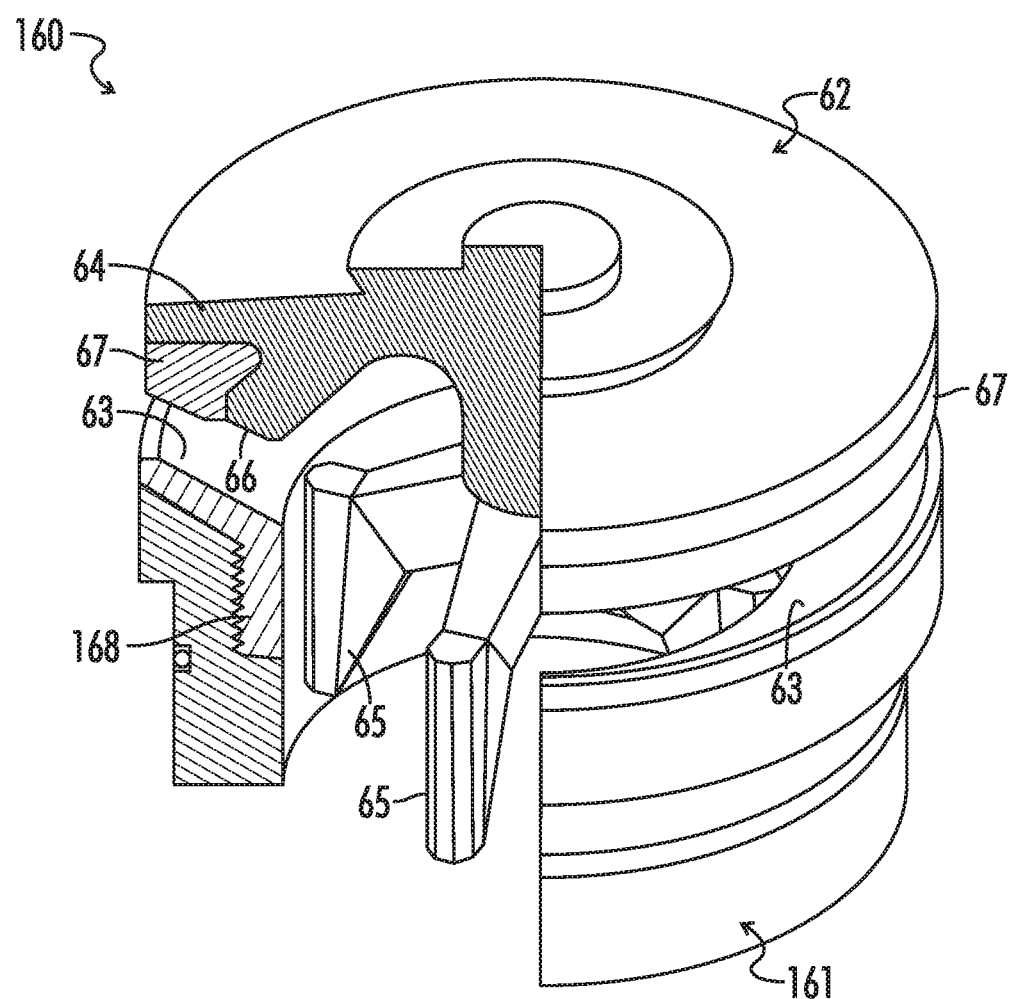
FIG. 7 is an isometric view, with an axial quarter-section removed, of a novel valve 160 that may be used in pumps of the general design of pump 10 shown in FIGS. 1-5, which valve 160 comprises a seat insert 168.

One improvement 160 to the fluid end of conventional pumps such as pump 10 is exemplified in FIG. 7. FIG. 7 exemplifies an improved valve 160. In contrast to conventional valve 60, seat 161 in novel valve 160 has an insert 168, and seat surface 63 is provided on insert 168. Insert 168 is threaded into seat 161 or otherwise removably mounted therein, for example, by an interference fit. It will be appreciated that seat surface 63 of conventional valve 60 is particularly susceptible to erosion by the abrasive fluids passing through valve 60. By providing seat surface 63 of valve 160 on seat insert 168, valve 160 may be rebuilt more easily in the event seat surface 63 wears unacceptably.

Figure 8:
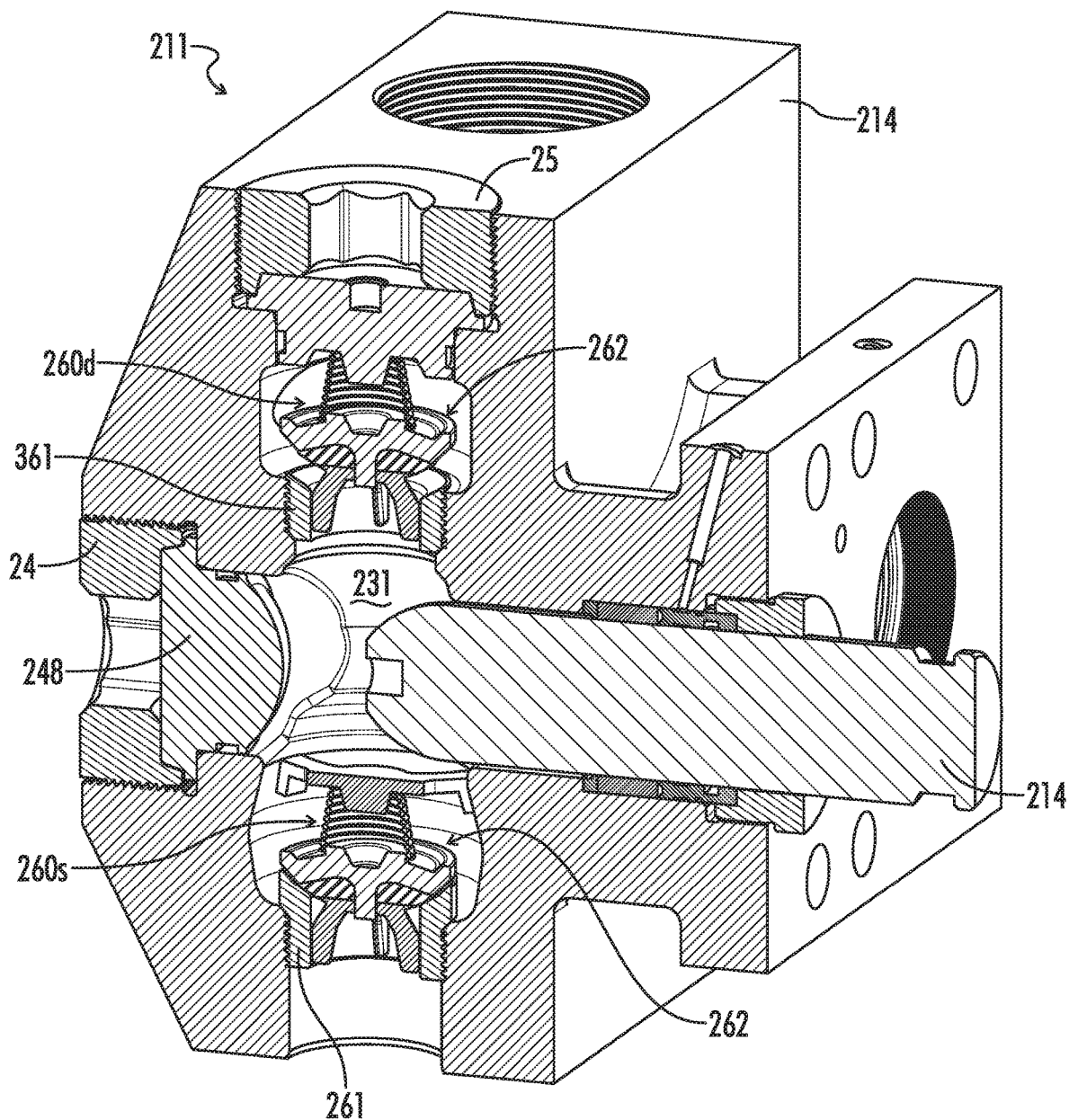
FIG. 8 is an isometric, cross-sectional view of a preferred embodiment 211 of the novel fluid ends of the subject invention incorporating other preferred embodiments 260s and 260d of the novel valves, a preferred embodiment 213 of the novel plungers, and a preferred embodiment 248 of the novel suction plugs.
Figure 9:
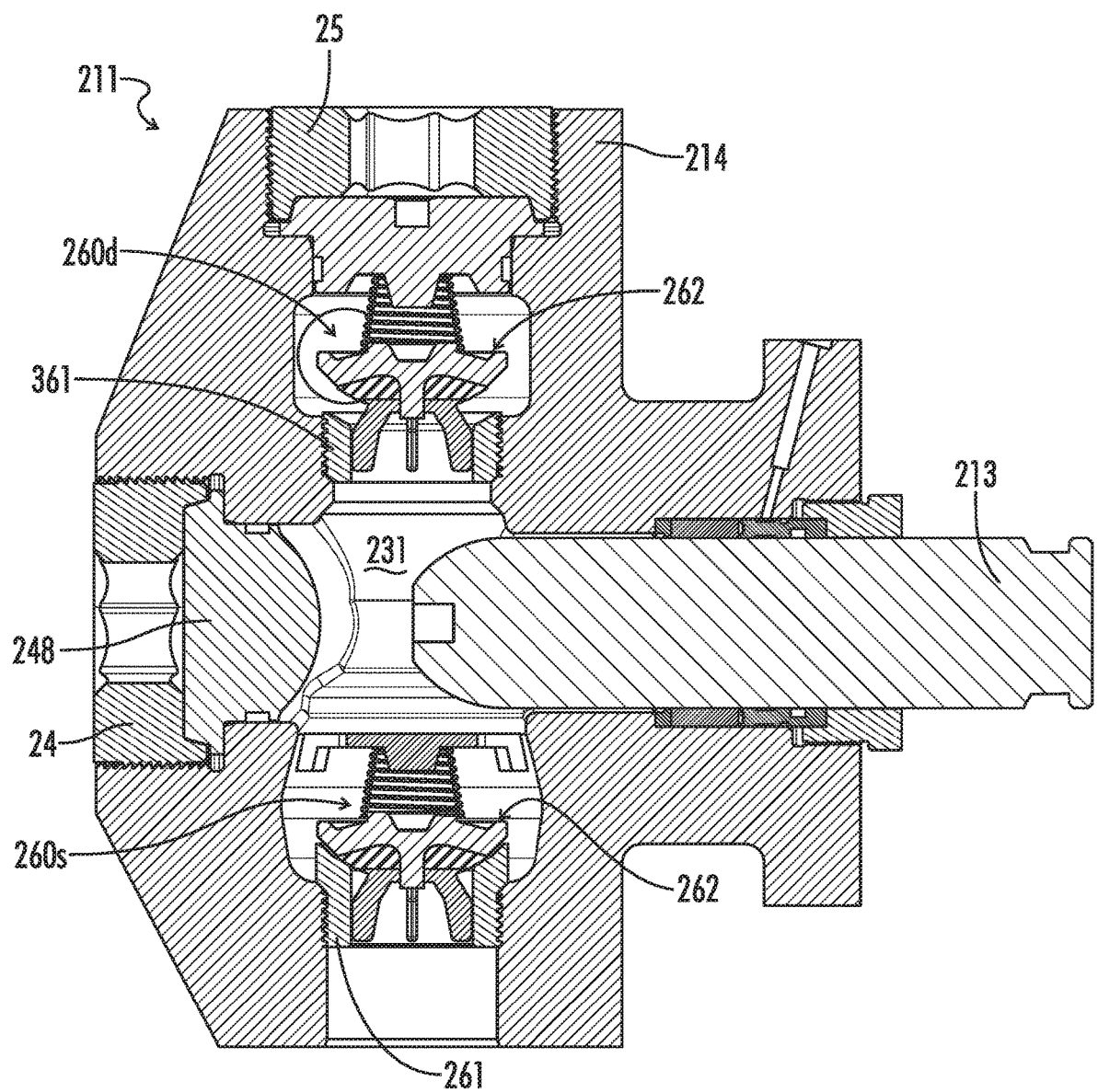
FIG. 9 is a cross-sectional view of novel fluid end 211 shown in FIG. 8.
Figure 10:
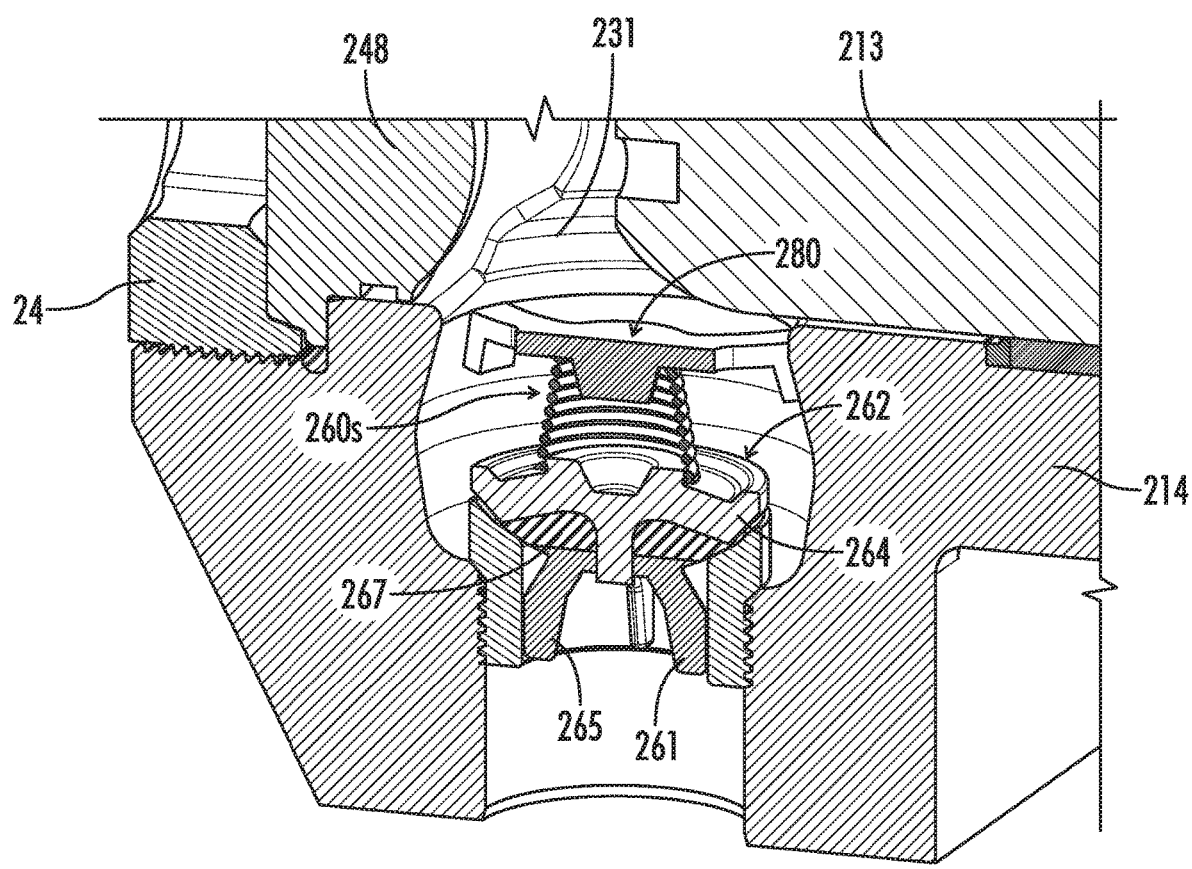
FIG. 10 is an enlarged isometric, cross-sectional view of a suction unit of novel fluid end 211 shown in FIGS. 8-9 showing in greater detail novel valve 260s and a preferred embodiment 269 of the novel suction valve retainers.

Various other improvements to such conventional pump designs and, in particular, to the fluid ends of such pumps are exemplified by novel fluid end 211 illustrated in overview in FIGS. 8-9. As may be seen therein, fluid end 211 generally comprises a novel suction valve 260s, a novel discharge valve 260d, a novel plunger 213, and a novel suction plug 248, all mounted within cylinder block 214. Suction valve 260s is shown in greater detail in FIG. 10. As may be seen therein, suction valve 260s generally comprises a novel seat 261 and novel valve body 262. Valve body 262 is held in place by novel suction valve retainer 269.

Referring to FIG. 6, it will be appreciated that conventional seat 61 is mounted within cylinder block 114 by a friction fit. Its outer surface has a slight taper, and it will be forcefully inserted into cylinder block 114 until its top shoulder bears on block 114, i.e., until it "shoulders out." Both seat 61 and fluid end block 114, however, necessarily are fabricated from relatively hard steel. Thus, the process of forcing seat 61 into fluid end block 114 creates stress in the parts, and particularly at the upper edge of the opening in block 114.

It also will be appreciated that the fluid end block of frac pumps is subject to extremely high, cyclic pressures. Those portions of the fluid end block that are subject to highly localized stress, such as that created by pressure fitting valve seat 61 into conventional block 114, are particularly susceptible to micro fracturing. Micro fractures not only eventually enlarge, but they also exacerbate corrosion and erosion issues.

Moreover, in practice, seat 61 often is not shouldered out during installation. A seal between seat 61 and block 114 may not be established and valve body 62 may not be able to form a seal with seat 61 as effectively. Seat 61 may not shoulder out until the pump is operated and fluid pressure forces it down. Especially when installed on the discharge side, that may take some time, until pressure builds throughout the well.

Figure 11A:
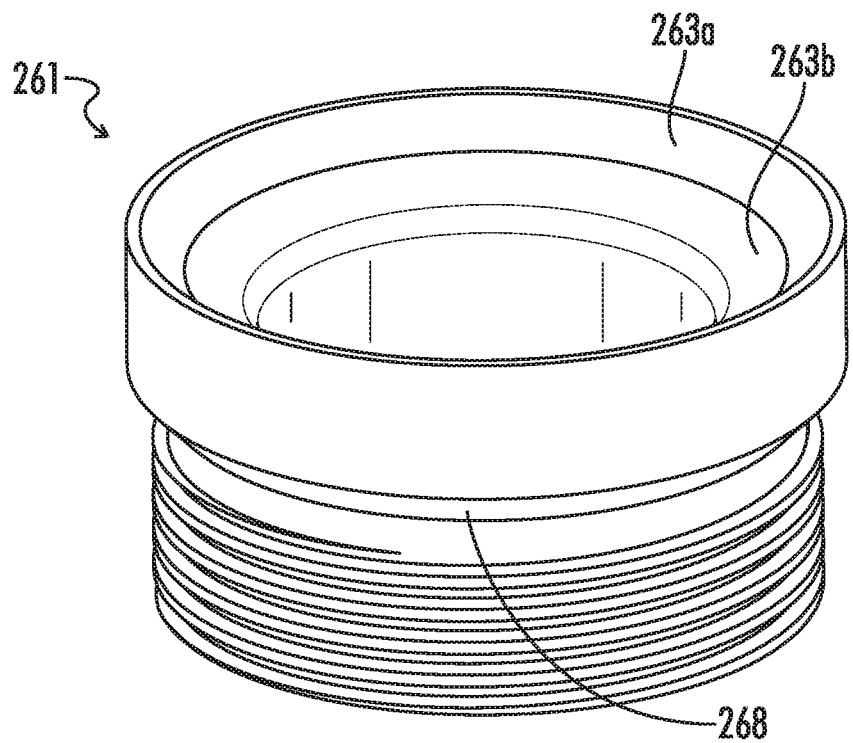
FIG. 11A is an isometric part view of novel seat 261 of valve 260s shown in FIG. 10.
Figure 11B:
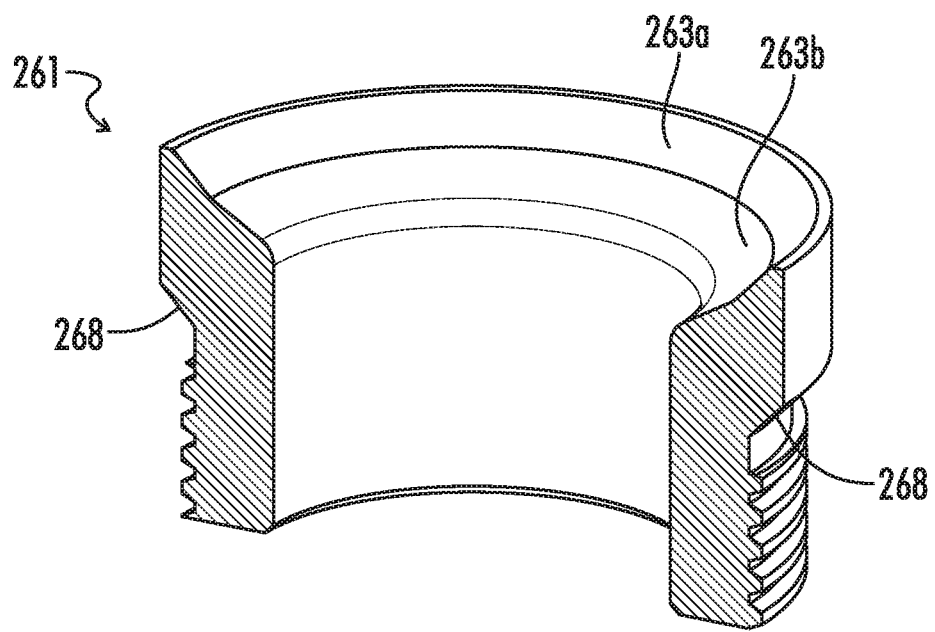
FIG. 11B is an isometric, cross-sectional part view of novel seat 261.

Novel suction valve 260s, therefore, is provided with a threaded seat 261, as seen best in the part views of FIG. 11. Seat 261 had a generally cylindrical body defining an axial passage. The body has a radially enlarged upper end. The precise dimensions of seat 261 may be varied somewhat. The lower portion of seat 261 is provide with external threads that will engage corresponding internal threads in a bore of fluid end block 214. The upper enlarged portion provides adjoining annular seat surfaces 263a and 263b upon which, as discussed further below, valve body 262 will seat to shut suction valve 260s.

It also will be noted that seat 261 is provided with an external chamfered annular surface 268 situated above the threads. Surface 268 in effect provides a beveled shoulder that, as may be seen in FIG. 10, will form a metal-to-metal seal with a corresponding bevel in block 214 when seat 261 is installed. If desired, additional sealing elements, such as an elastomer O-ring, may be provided.

Because it is threaded, seat 261 does not create nearly as much localized stress in block 214. Moreover, it may be more reliably shouldered out during installation, thus increasing the likelihood of establishing an effective seal between seat 261 and block 214. If damaged, seat 261 also may be replaced easily instead of rebuilding or scrapping the entire fluid end block 214.

Figure 12:
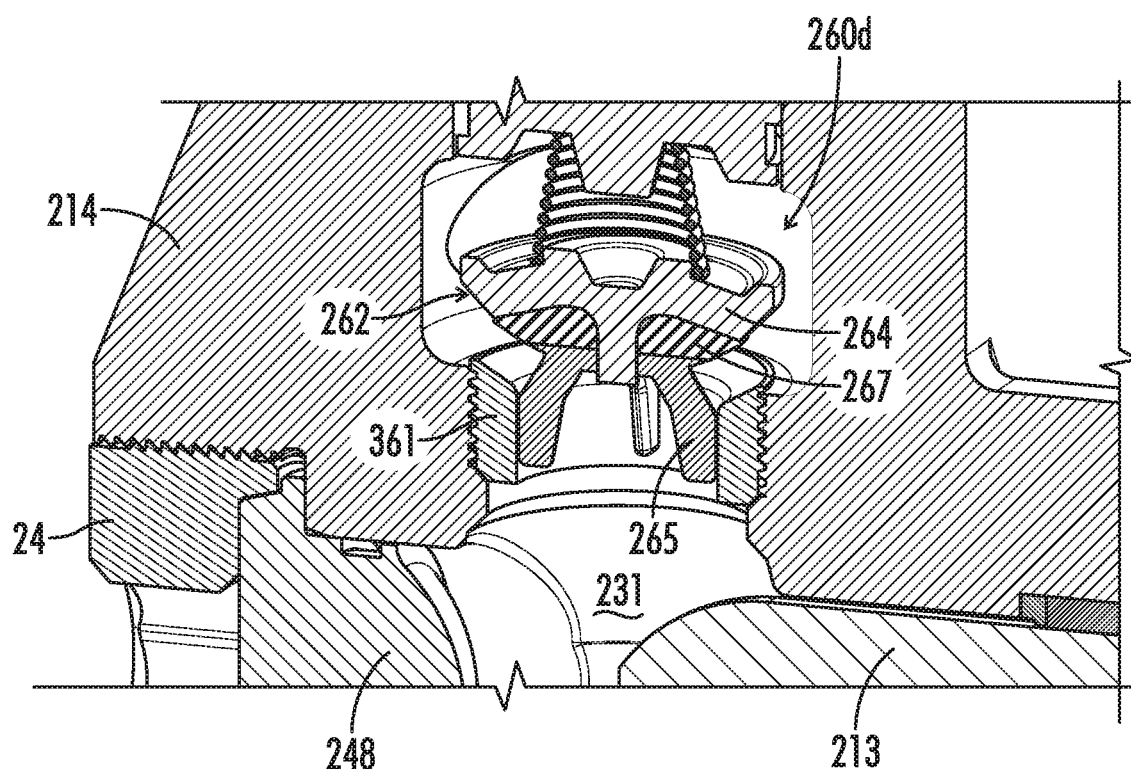
FIG. 12 is an enlarged isometric, cross-sectional view of a discharge unit of novel fluid end 211 shown in FIGS. 8-9 showing in greater detail novel valve 260d.

A similar improvement is reflected in discharge valve 261d. As may be seen in FIG. 12, discharge valve 261d is provided with a threaded seat 361. Threaded seat 361 is shown in more detail in the part views of FIG. 13. It is similar to threaded seat 261 in that it has external threads that allow it to be threaded into block 214. An annular seat surface 363 is provided on the top of threaded seat 361. Seat surface 361 is a single, continuous surface, but it may include different seat surfaces having different seating angles as does threaded seat 261. In contrast to seat 261, however, threaded seat 361 is provided with an external chambered annular surface 368 that is situated below the threads. When seat 361 is installed, beveled surface 368 will form a metal-to-metal seal with a corresponding bevel in block 214. Like seat 261, seat 361 may be reliably shouldered out during installation, will create less localized stress in block 214, and may be easily replaced if it is damaged or worn.

Bevels 268/368 in seats 261/361, as noted, allow an effective metal-to-metal seal to be established with block 214. They are beveled at an angle of approximately 45°, but other angles may be suitable. If desired, threaded seats also may be provided with a more or less flat upper shoulder and supplemented, if desired, with additional sealing elements, such as an elastomer O-ring.

Figure 14A:
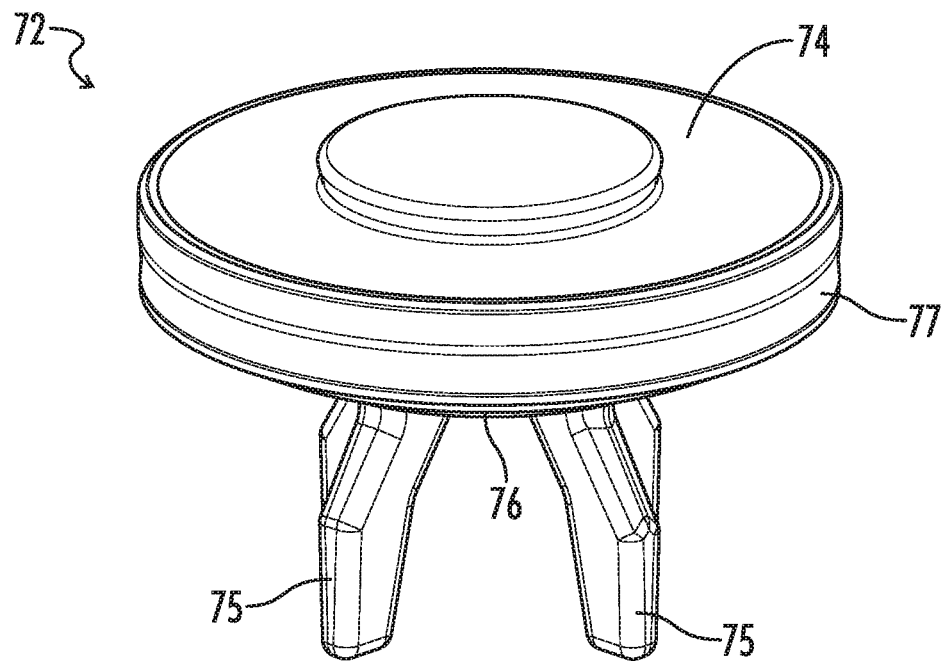
FIG. 14A (prior art) is an isometric part view of a prior art valve body 72 which may be used, for example, in novel fluid end 211.
Figure 14B:
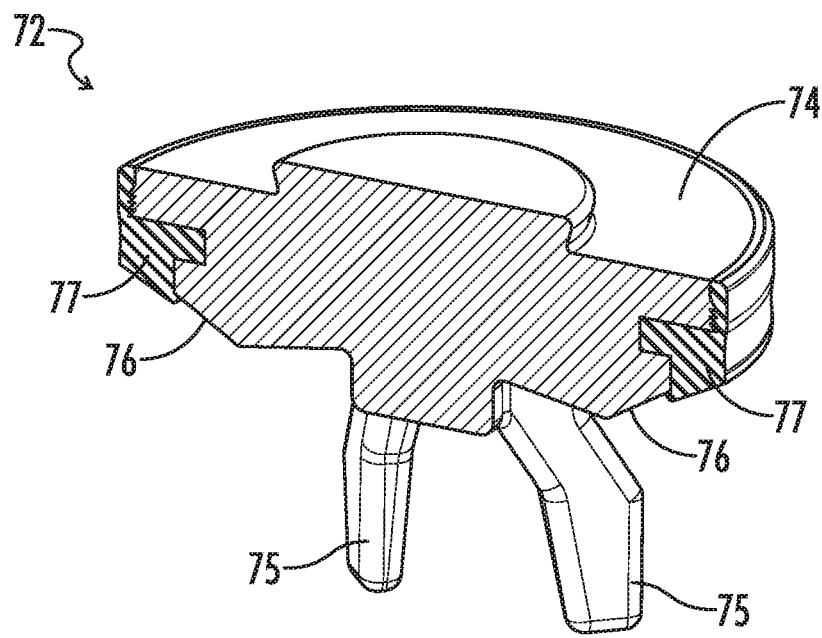
FIG. 14B (prior art) is an isometric, cross-sectional part view of prior art valve body 72.

Other improvements to conventional pump designs such as pump 10 may be exemplified by first referring again to FIG. 6 and to FIGS. 14A-14B. As noted, prior art valve body 62 has an elastomeric seal 67 that is situated radially outward of valve surface 66 on the bottom of valve head 64. Similarly, prior art valve body 72 shown in FIG. 14 has an elastomeric seal 77 that is located radially outward of a valve surface 76 on the annular bottom of a valve head 74. In both designs, elastomeric seals 67/77 must be molded in situ with valve head 64/74. That is, valve heads 64/74 will be incorporated into a mold and elastomeric, seals 67/77 will be molded on heads 64/74. As a consequence, the materials from which seals 67/77 may be fabricated are limited essentially to elastomers or other materials suitable for such in situ processes.

It also will be appreciated that elastomeric seals 67/77 are cyclically compressed 2 or 3 times a second when the pump is operating. Moreover, when the valves open, fluid flows radially outward, and rapidly through the gap between the seat, such as seat 61, and the valve body, such as valve body 62. Elastomeric seals 67/77 can be forced or extruded radially outward. As gaps are created between elastomeric seals 67/77 and valve surfaces 66/76, particles in the abrasive fluid passing through the valves can become entrained in valve bodies 62/72. Such effects can significantly diminish the efficacy of elastomeric seals 67/77. At the same time, as valve heads 64/74 close, seals 67/77 will tend to push fluid back radially inward, against the general flow, thus tending to trap gritty particles under valve surfaces 66/76.

Thus, another improvement to conventional fluid ends is exemplified in FIGS. 8-9. FIGS. 8-9 shows an improved valve body 262 incorporated into valves 260s and 260d, As best appreciated from the part drawings of FIG. 15, valve body 262 is a three-piece design incorporating a head 264, a set of legs 265, and a seal 267. Head 264 has a downwardly extending post with external threads. Threaded legs 265 are provided with a threaded opening allowing them to be threaded onto head 264. Head 264 and legs 265, however, may be coupled together by other conventional methods, such as by spin welding or by a friction fit.

Like conventional valve bodies 62/72, seal 267 typically will be fabricated from an elastomer and a valve surface 266 is provided on the annular bottom of valve head 264. In contrast, seal 267 in novel valves 260 is mounted radially inward of valve surface 266. More specifically, seal 267 has a central opening that allows it to be mounted around the post on valve head 264. When valve body 262 is assembled, therefore, seal. 267 will be disposed between the main portion of valve head 264 and legs 265. Valve surface 266 will tend to back up elastomeric seal 267 and reduce the likelihood that it will be extruded by fluid flowing through valves 260. Other factors being equal, moving elastomeric seal 267 radially inward also provides valve surface 266 with more surface area, thus providing a wider, larger metal-to-metal seal. The larger surface area also better distributes the force created when valve head 264 hits seat 261 as the pump is operated.

At the same time, elastomeric seal 267 will protect the leading edge of valve surface 266 from abrasion. That may decrease the service life of elastomeric seal 267, but the primary seal for valve 260 is provided by the metal-to-metal contact between seat surface 263a and valve surface 266. Moreover, by moving valve surface 266 radially outward, its effective contact surface area is increased, and it is situated in an area of reduced fluid velocity. Thus, the service life of valve surface 266 and valve body 262 is expected to increase correspondingly.

Elastomeric seal 267 preferably, as exemplified, extends slightly beyond valve surface 266. Thus, for example, as valve body 262 begins to close, elastomeric seal 267 will contact seat surface 263b before valve surface 266 contacts seat surface 263a. It will tend to start shutting off flow entering the closing gap between seat 261 and valve body 262. As valve body 262 continues to close, it is believed that fluid will be more effectively pushed out of the gap. As compared to conventional seals 66/76, seal 266 will tend to push flow out of the gap instead of into the gap, thus leaving less particulate matter between seat surface 263a and valve surface 266 when the gap is finally closed.

Figure 15A:
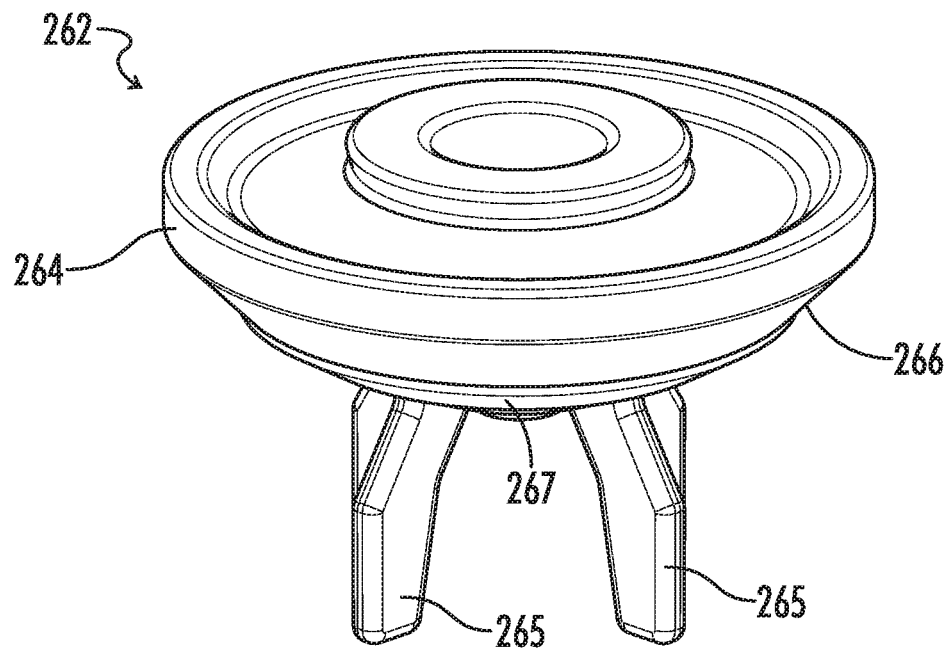
FIG. 15A is an isometric part view of another embodiment 262 of the novel valve bodies, which valve body 262 incorporates a radially interior elastomer seal 267 and is incorporated in novel valves 260s/260d of novel fluid end 211 shown in FIGS. 8-9.
Figure 15B:
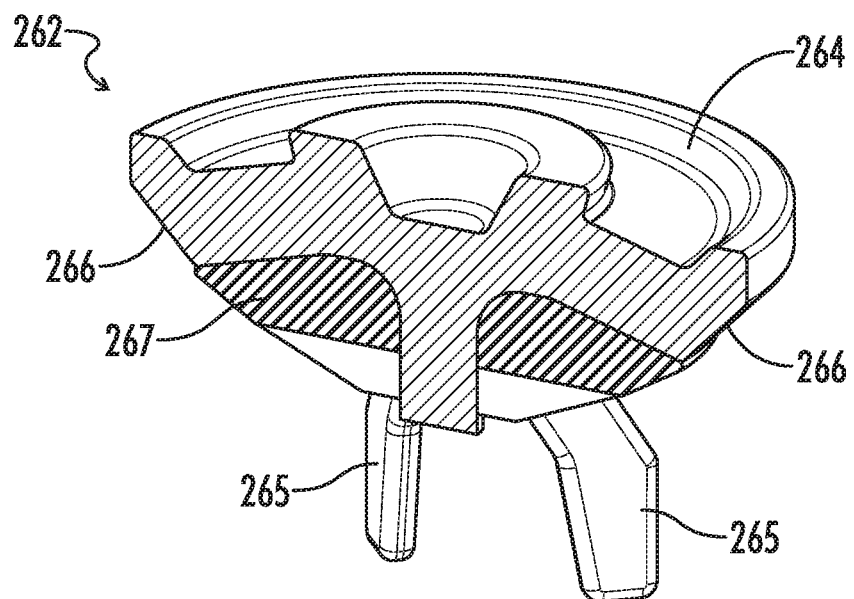
FIG. 15B is an isometric, cross-sectional view of novel valve body 262.

It also will be noted from the view of FIG. 15B that the surface of seal 267 extends more or less along a shallower angle than valve surface 266. That is, the seating angle for seal 267 is shallower than that of the metal valve surface 266. In this regard, and referring back to FIG. 11, it will be recalled that seat insert 261 provides adjoining seat surfaces 263a and 263b. The angle on seat surfaces 263a and 263b are more or less complementary, respectively, to the seating angle of valve surface 266 and elastomer seal 267.

While a steeper angle may be desirable for valve surface 266, as discussed further below, a shallow angle may be preferred for elastomer seal 267. It is far less likely to become wedged and cause valve body 262 to stick in seat 261. Moreover, the seating angle for elastomer seal 267 may generally correspond to, but be somewhat shallower that the angle of seat surface 263b on seat insert 261. Especially given that the upper end of seal 267 extends slightly beyond valve surface 266, the "squeegee" effect of seal 267 will be enhanced.

The squeegee effect of seal 267 also may be enhanced by providing its radially outward sealing surface with a slightly curved, convex surface, what may be viewed as a chordally truncated torus. That will allow seal 267 to initially make "point" contact with seat 261. The curve need only be slight. Alternately, the seat surface or a portion of it also may be slightly curved to provide initial point contact with a flat seal to encourage fluids to be squeegeed out as the valve closes. On the other hand, if desired, a single, continuous seat surface, such as seat surface 363 in seat insert 361, may be used with a valve head where the seating surface of the valve surface and seal extend at the same angle.

Elastomers will constitute preferred materials from which seal 267 may be fabricated. Elastomeric seals can effectively create a squeegee effect as discussed above. Because seal 267 may be fabricated separately and need not be molded to head 264, however, it may be made from a wider variety of materials that may prove more suitable for specific applications. For example, seal 267 may be made of fibrous materials, such as Kevlar. Elastomer infused fibrous materials also may be used. Such materials may be more tolerant to embedded particles and provide a longer wear life. Like an elastomer seal, such materials also are somewhat compressible.

Figure 16:
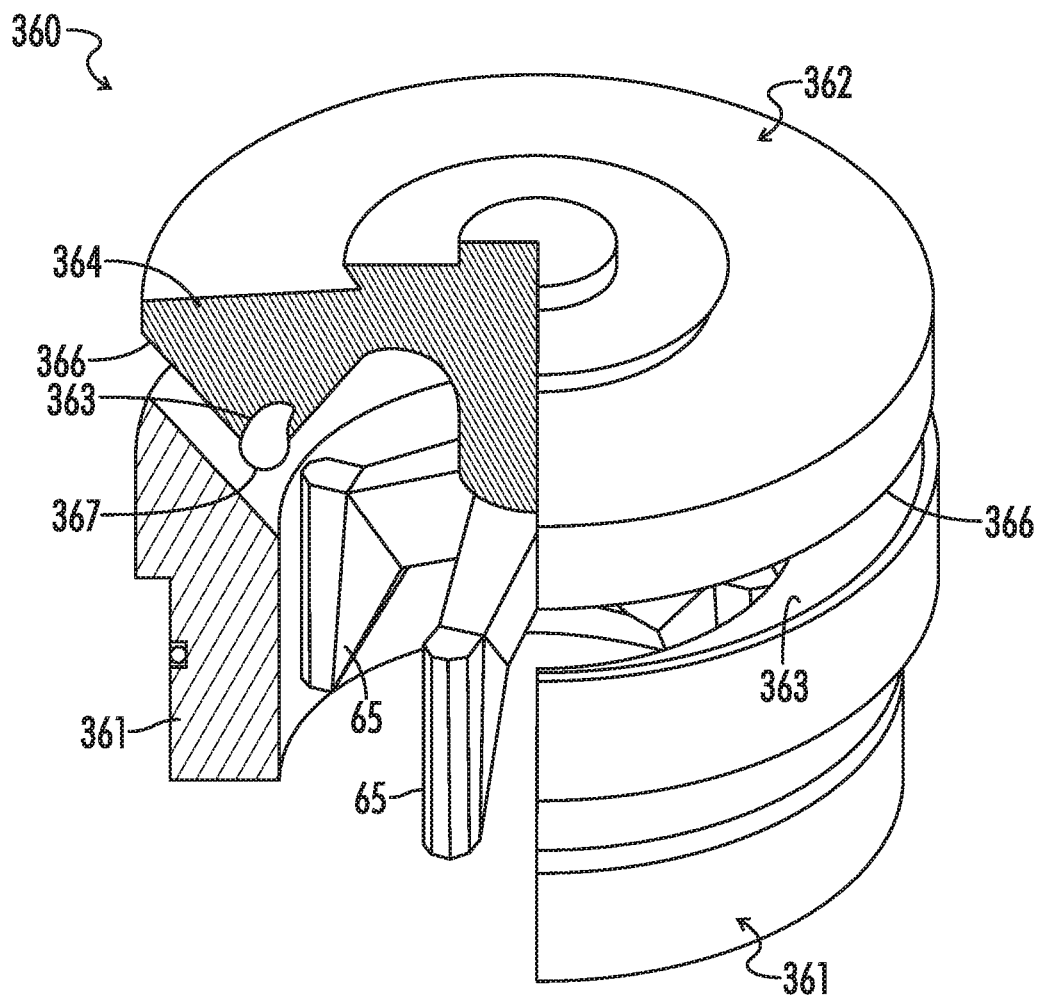
FIG. 16 is an isometric view, with an axial quarter-section removed, of another embodiment 360 of the novel valves which may be used in pumps such as pump 10, which valve 360 incorporates highly angled seat surface 363 and valve surface 366.

Another improvement 360 to conventional fluid ends is exemplified in FIG. 16. FIG. 16 shows another improved valve 360. Similar to conventional valve 60 shown in FIG. 6, novel valve 360 has a seat 361 and valve body 362. Unlike seat surface 63 and valve surface 66 in valve 60, which have complementary 45° angles, seat surface 363 and valve surface 366 in novel valve 360 are provided with much greater complementary angles. By providing a steeper angle through the gap between seat 361 and valve body 362, flow through the gap will be less turbulent and more laminar, reducing impingement erosion of surfaces 363 and 366. A steeper angle also creates more surface area, and can help reduce fluttering caused by the Bernoulli effect as fluid flows through the gap. It is expected that angles somewhat greater than 45° will be beneficial. Steeper angles necessarily will increase the length of valve 360, but it is expected that angles may be as high as about 70°. An angle of approximately 60°, or somewhat greater or less than 60°, may be more preferred.

Figure 17:
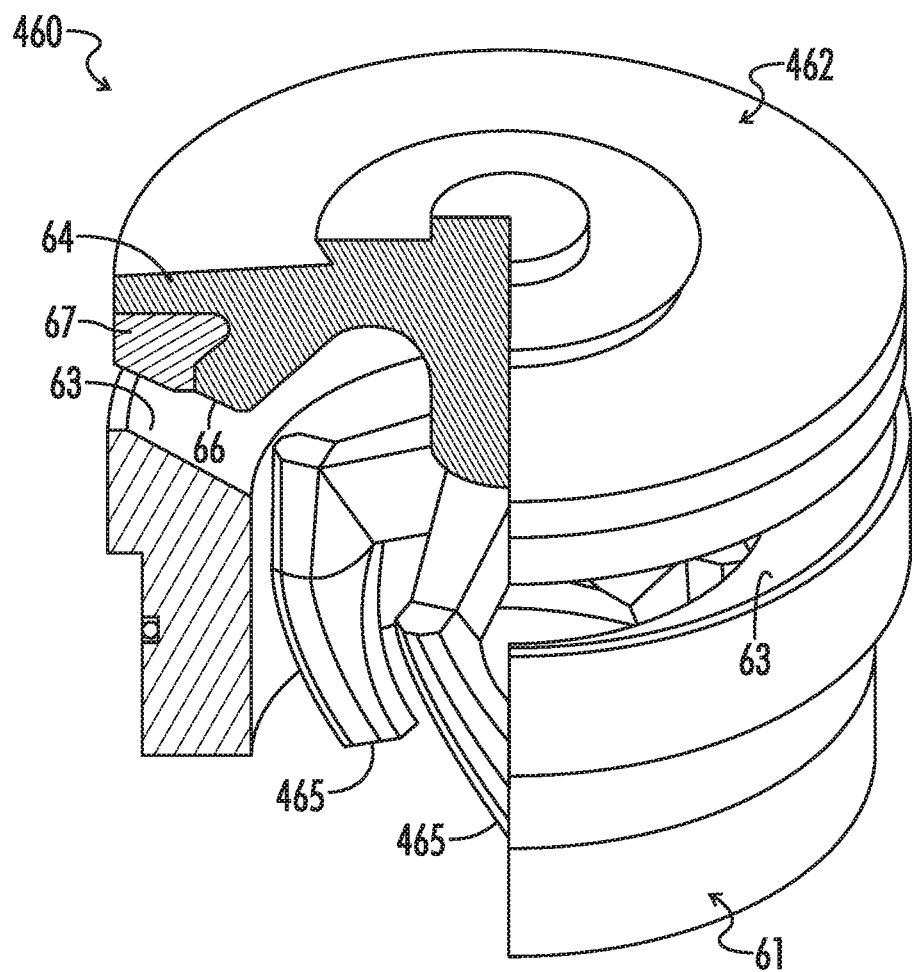
FIG. 17 is an isometric view, with an axial quarter-section removed, of another preferred embodiment 460 of the novel valves which may be used in pumps such as pump 10, which valve 460 comprises "vaned" legs 465.

Another improvement 460 to conventional fluid ends is exemplified in FIG. 17. FIG. 17 shows another improved valve 460. Similar to conventional valve 60 shown in FIG. 6, valve body 462 has a head 64 from which depend a plurality of legs 465. Like legs 65 in valve 60, legs 465 in novel valve 460 serve to guide valve body 462 as it moves up and down in the central passage of seat 61. Legs 465 are spaced and extend downward and radially outward from a central column on head 64, but they also are tilted relative to the central axis of valve 460.

In other words, fluid flowing up through seat 61 flows generally along the central axis of valve 460. Legs 465 extend into the central passage of seat 61 and are configured such that they act as vanes, inducing valve body 462 to rotate about its central axis as fluid flows past them. Valve body 462 typically is a unitary component, but it may be desirable to fabricate head 64 and "varied" legs 465 as separate components as in valve body 262. Fabrication of legs 465 may be easier, and they may be secured to head 64 by, e.g., threaded or welded connections. Similarly, vanes may be provided elsewhere on valve body 462, for example, on the top surface of head 64.

Each time valve body 462 opens, therefore, it will tend to rotate a small increment relative to seat 61 before it lands again on seat 61. It is believed such incremental rotation of valve body 462 will help reduce wear on seat surface 63 and valve surface 66 and to keep those surfaces free of debris and minimize impacted particles on them. Valve body 462 will tend to wipe seat 61 as it incrementally rotates. Valve surface 66 on valve body 462 also will not be subject to preferential flow patterns that may exist through valve 460.

Figure 18:
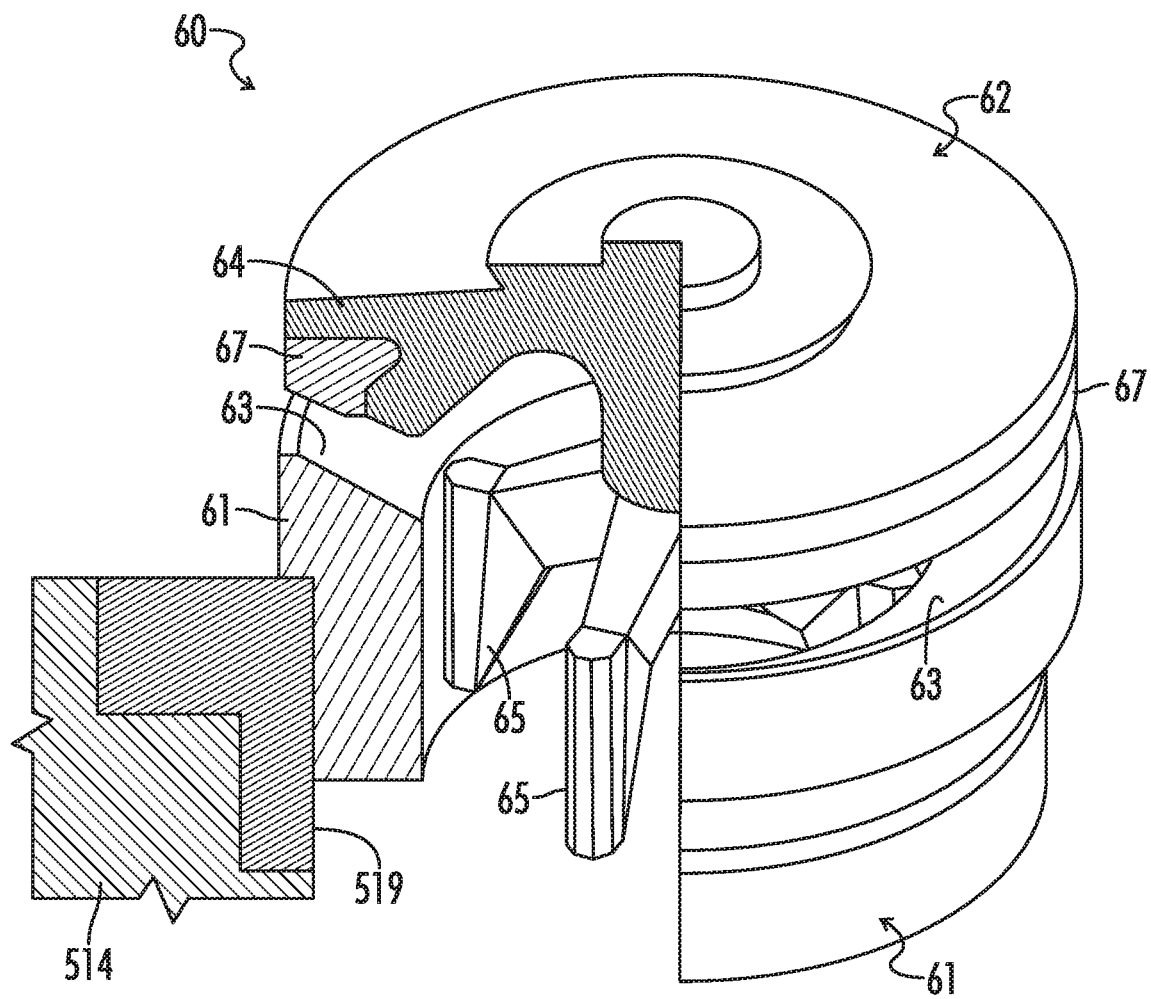
FIG. 18 is an isometric view, with an axial quarter-section removed, of valve 60 mounted in a novel fluid end block 514, which fluid end block 514 may be used in pumps of the general design of pump 10 shown in FIGS. 1-5 and comprise a port insert 519.

Another improvement to such fluid ends is exemplified in FIG. 18. FIG. 18 shows conventional valve 60 mounted in a novel fluid end block 514. As noted, and referring first to FIG. 6 for comparison, conventional valve 60 is mounted in discharge port 44 of conventional fluid end block 14. More particularly, seat 61 is slightly tapered, and is forced into the cylindrical discharge port 44 and held there by an interference fit. Both seat 61 and fluid end block 14, however, necessarily are fabricated from relatively hard steel. Thus, the process of forcing seat 61 into fluid end block 14 creates stress in the parts, and particularly at the upper edge of the opening in block 14.

Novel fluid end block 514, therefore, is provided with an insert 519. Insert 519 is pressure fitted into block 514 and has what may be characterized as a rimmed, cylindrical shape. A portion of insert 519 extends downward into fluid end block 514, and a portion extends radially outward into fluid end block 514. The precise dimensions of insert 519, and the relative dimensions of its two portions, may be varied. Insert 519 also may have a generally cylindrical shape. Importantly, however, insert 519 is fabricated from more ductile steel than are fluid end block 514 and valve seat 61. The ductile material is better able to dissipate and distribute the stress of an interference fit. Moreover, the ductile insert 519 should allow valve 60 to be removed more easily from fluid end block 514 in the event it must be replaced.

It also will be appreciated that the fluid end block of frac pumps is subject to extremely high, cyclic pressures. Those portions of the fluid end block which are subject to highly localized stress, such as that created by pressure fitting valve 60 into conventional block 14, are particularly susceptible to micro fracturing. Micro fractures not only eventually enlarge, but they also exacerbate corrosion and erosion issues. Ductile insert 519 not only is better able to distribute such stresses, but if it is damaged, it may be replaced instead of rebuilding or scrapping the entire fluid end block 514.

Figure 19:
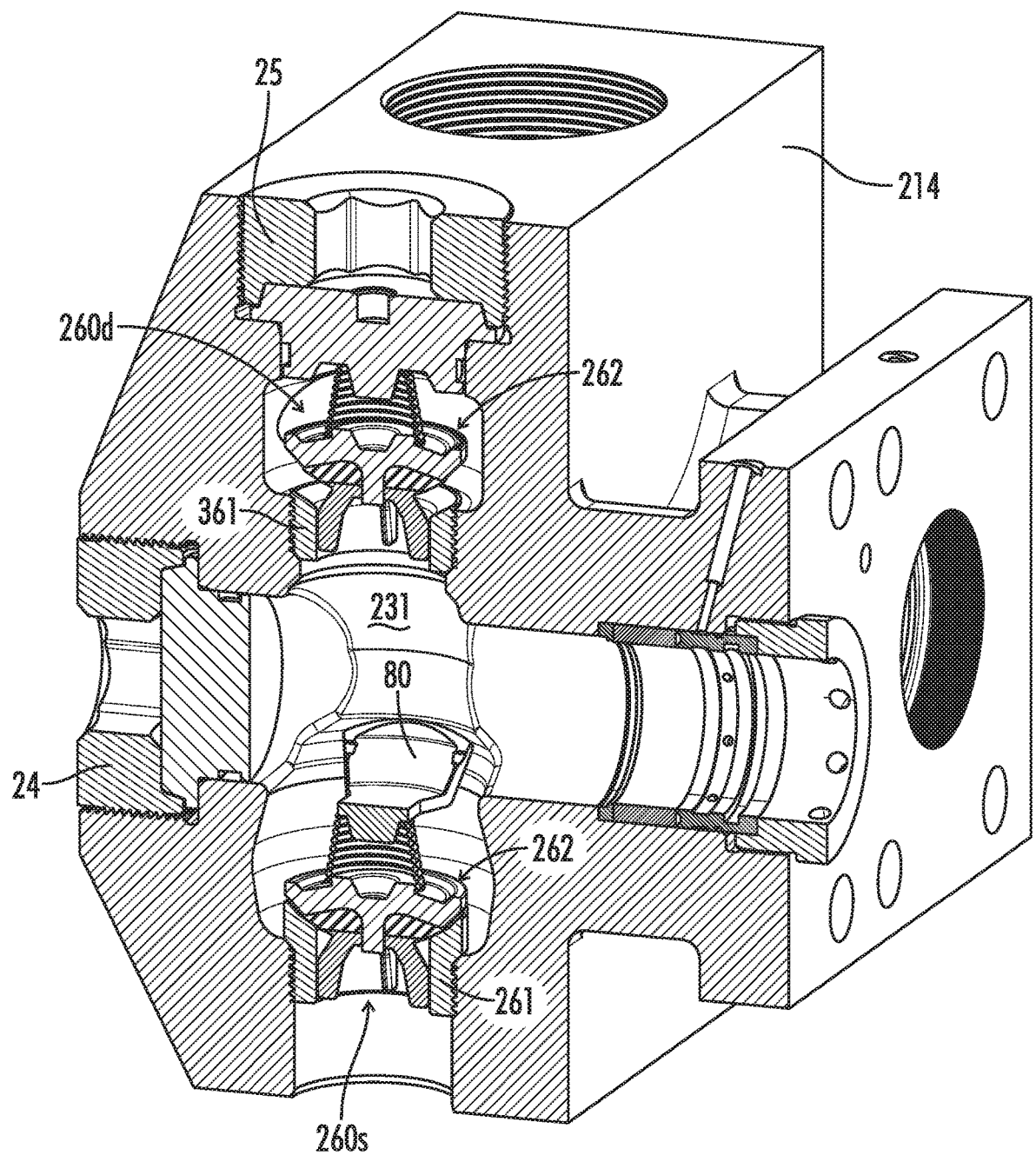
FIG. 19 is an enlarged, isometric cross-sectional view of fluid end 211 as shown in FIG. 8, except that it incorporates a prior art suction valve retainer 81.
Figure 20:
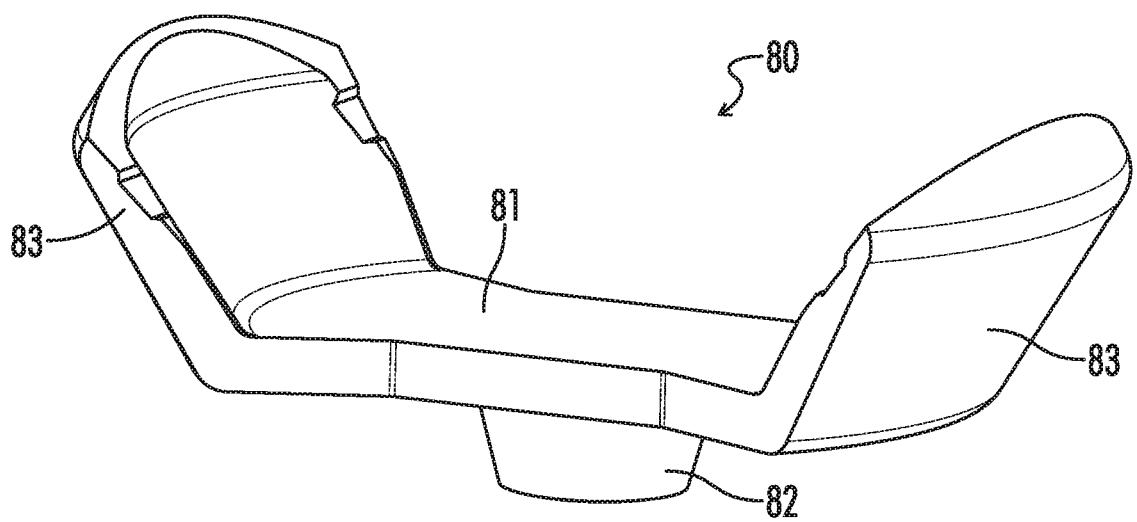
FIG. 20 (prior art) is an isometric part view of prior art suction valve retainer 81 shown in FIG. 19.

Other improvements to conventional pump designs such as pump 10 may be exemplified by first referring to FIGS. 19-22. FIG. 19 shows novel fluid end 211 as shown in FIGS. 8-9, except that it incorporates a conventional suction valve retainer 80. As may be seen best in the part view of FIG. 20, retainer 80 comprises a somewhat elongated central body 81. A lug 82 extends downward from body 81 and is adapted to engage the upper end of a spring extending between retainer 80 and the upper surface of valve head 262. An upward sweeping arm 83 extends from each end of body 81. As may be seen in FIG. 19, when the spring is under compression, arms 83 of retainer bear on and within grooves provided within pump chamber 231, thus holding valve body 262 in place. Body 81 spans the distance between the walls of pump chamber 231.

It will be appreciated that retainer 80 generally will be expected to securely retain valve 260 in place. Arms 83 provide relatively large bearing surfaces and fit neatly within the grooves in pump chamber 231. Pump chamber 231, however, already is an area of relatively high stress within fluid end block 214, and the grooves required to mount retainer 80 weaken that area. Moreover, the grooves are difficult and expensive to machine.

Figure 21:
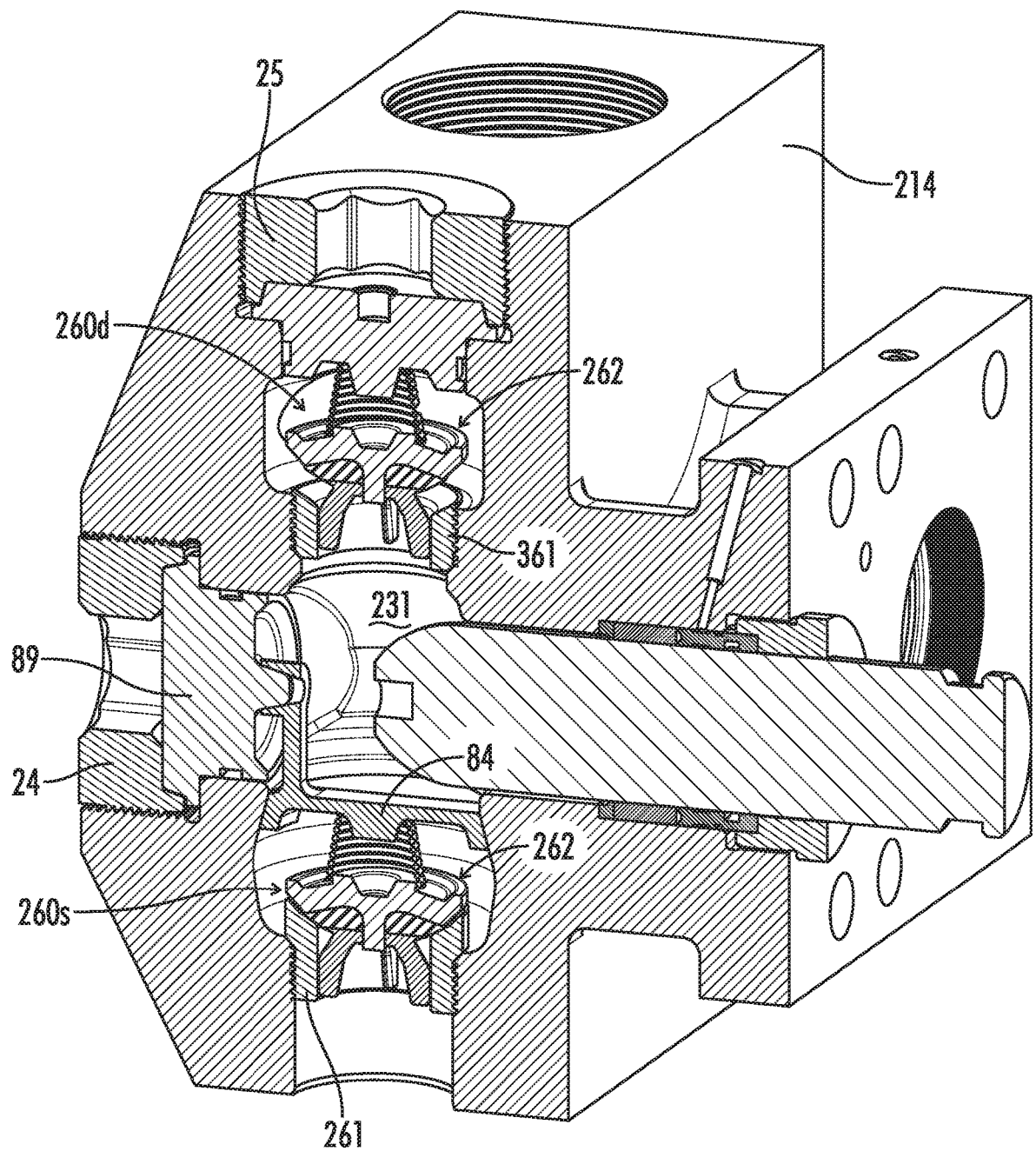
FIG. 21 is an enlarged, isometric cross-sectional view of fluid end 211 as shown in FIG. 8, except that it incorporates another prior art suction valve retainer 84 together with a prior art suction valve cover 89.
Figure 22A:
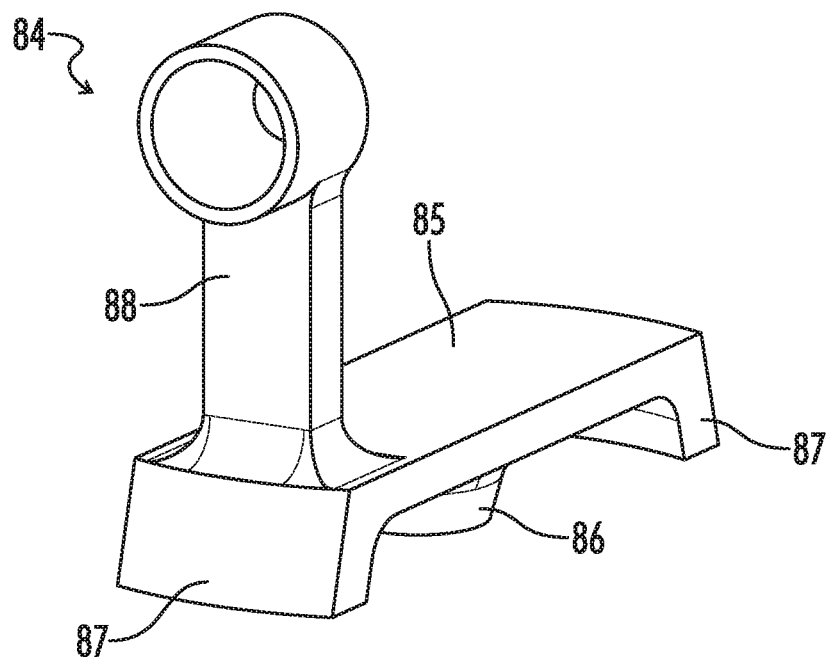
FIG. 22A (prior art) is an isometric part view, taken generally from above, of prior art suction valve retainer 84 shown in FIG. 21.
Figure 22B:
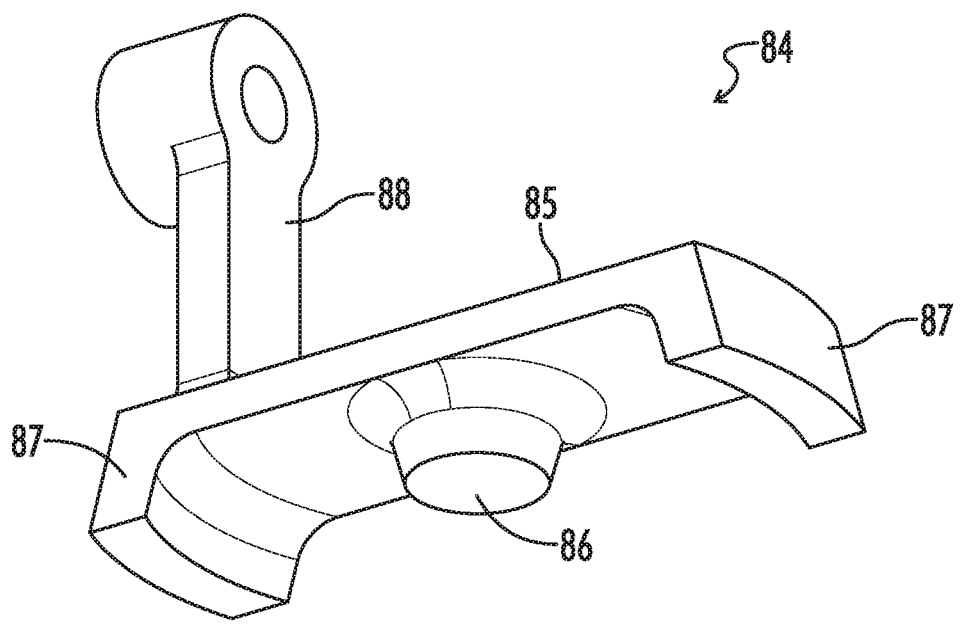
FIG. 22B (prior art) is an isometric part view, taken generally from below, of prior art suction valve retainer 84.
Figure 23A:
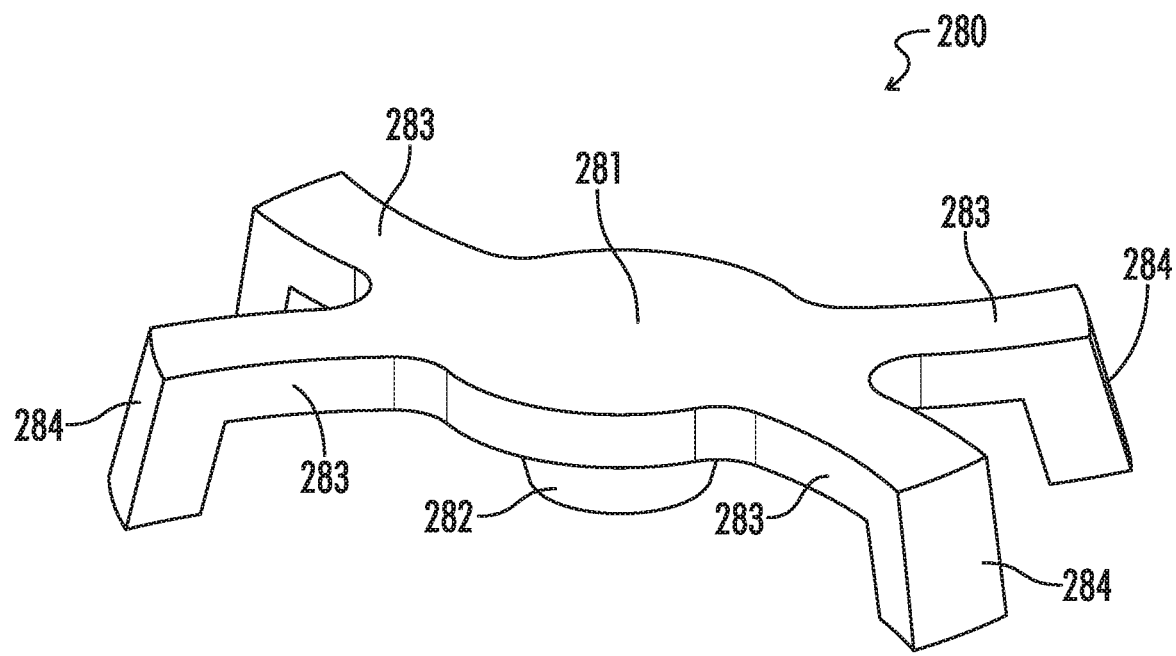
FIG. 23A is an isometric part view, taken generally from above, of a preferred embodiment 269 of the novel suction valve retainers, which retainer 269 is incorporated in novel fluid end 211 as shown in FIGS. 9-10.
Figure 23B:
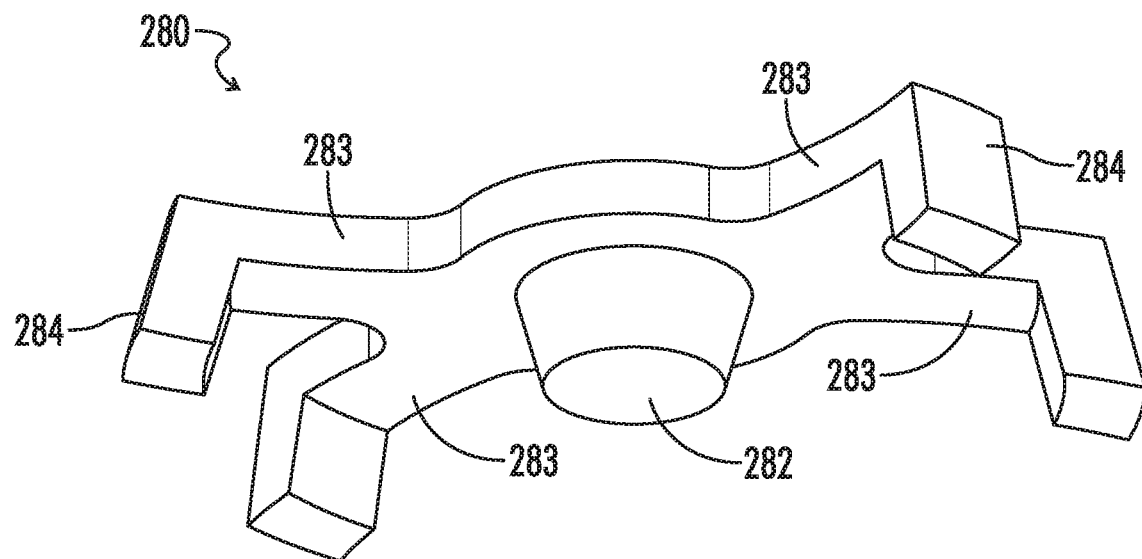
FIG. 23B is an isometric part view, taken generally from below, of novel suction valve retainer 269.
Figure 27:
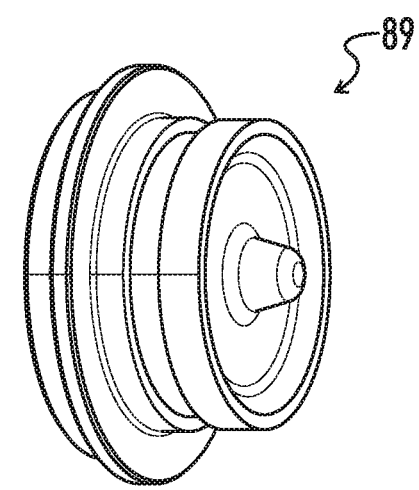
FIG. 27 (prior art) is an isometric part view of a prior art suction plug 89 that may be incorporated into novel fluid end 211 as shown in FIG. 21.
Figure 28:
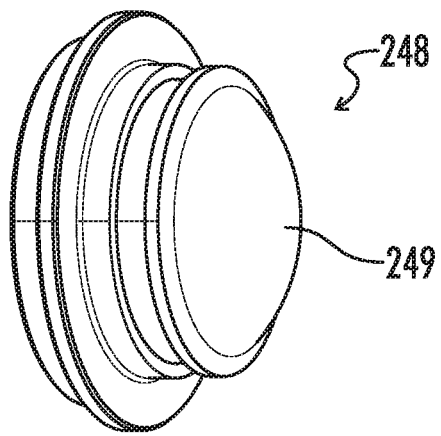
FIG. 28 is an isometric part view of a preferred embodiment of the novel suction plugs, which suction plug 248 is incorporated in novel fluid end 211 as shown in FIGS. 8-9.

FIG. 21 shows novel fluid end 211 with another prior art suction valve retainer 84. As may be seen best in the parts views of FIG. 22, retainer 84 has a somewhat elongated body 85. A lug 86 extends downward from body 85 and is adapted to engage the upper end of a spring extending between retainer 84 and the upper surface of valve head 262. A short, downward sweeping arm 87 extends from each end of body 85. A "periscope" 88 extends upward from one end of body 85. As may be seen in FIG. 21, when the spring is under compression, arms 87 will bear on the upper walls of the suction valve cavity below pump chamber 231. Periscope 88 will engage a lug on a prior art suction plug 89, which plug 89 is shown in part view in FIG. 27.

Prior art retainer 84, unlike retainer 80, mounts with the suction valve cavity below pump chamber 231 and does not require special grooves that may weaken fluid end block 214. Body 85 and arms 87 are relatively narrow, and thus allow fluid to flow more freely into pump chamber 231 than does retainer 80. Because arms 87 provide relatively small bearing surfaces, however, retainer 85 may not be held securely in place while the pump is operating. Periscope 88 must be coupled to suction plug 89 to provide the required stability.

Thus, as shown in FIGS. 8-9, novel fluid end 211 incorporates a preferred embodiment 280 of the novel suction valve retainers. As best appreciated from the part views of FIG. 30, suction valve retainer 280 has a relatively small body 281. A lug 282 extends downward from body 281 and is adapted to engage the upper end of a spring extending between the bottom of retainer 280 and the upper surface of valve head 262. A pair of arms 283 extend from opposite sides of body 281, each terminating in a downward extending bearing surface 284. Arms 283 extend symmetrically from body 281, thus providing first and second pairs of aligned bearing surfaces. As may be seen best in FIG. 10, when the spring is under compression, arms 283 will extend toward, and bearing surfaces 284 will bear on the inwardly tapered upper walls of the suction valve cavity below pump chamber 231.

It will be appreciated, therefore, that novel retainer 280 does not require any grooving in pump chamber 231 that may weaken fluid end block 214. It also presents a minimal cross-section to flow into pump cavity 231. Moreover, even though it has less bearing surfaces than, for example, prior art retainer 80, bearing surfaces 284 at the end of arms 283 are widely spaced to provide stability. Preferably, bearing surfaces will have a circular arc of from about 10 to about 15°, and the surfaces in each pair will be offset by about 15 to about 40°. Thus, it is expected that retainer 280 will provide minimal resistance to flow, but will remain securely mounted during operation of the pump.

Figure 24:
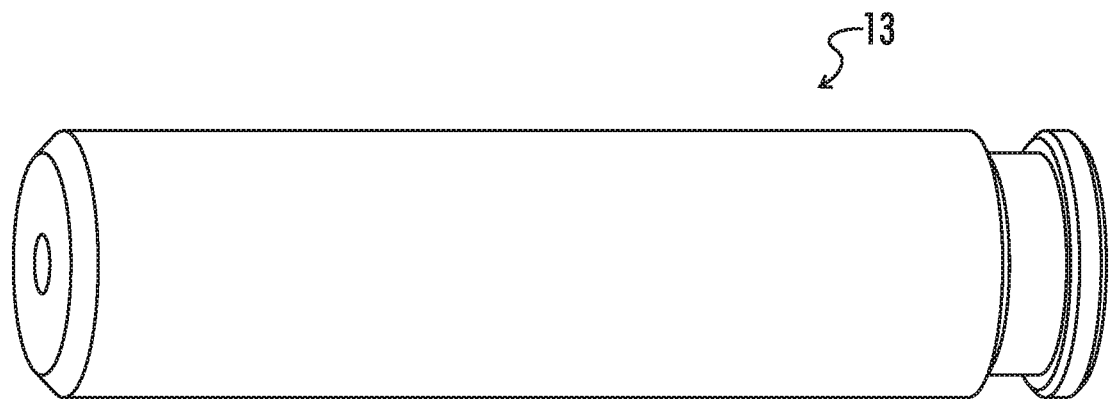
FIG. 24 (prior art) is an isometric part view of a prior art plunger 13 incorporated in prior art fluid end 11 shown in FIG. 5.
Figure 26:
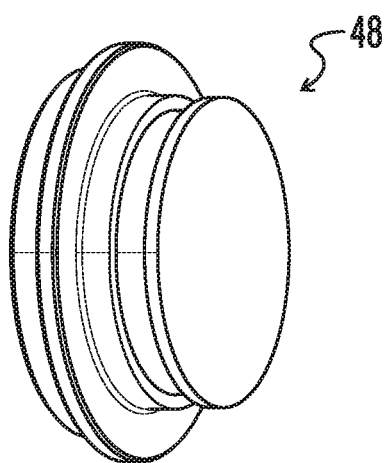
FIG. 26 (prior art) is an isometric part view of a prior art suction plug 48 incorporated in prior art fluid end 11 shown in FIG. 5.

Other improvements to conventional pump designs such as pump 10 may be exemplified by referring again to FIG. 5. Pump 10, as may be seen therein, incorporates plunger 13 and suction valve plug 48. When pump 10 is operating, plunger 13 will be moving in and out of pump chamber 31 two or three times a second and creating cycles of intense, high-pressure hydraulic shock. As will be appreciated best from FIGS. 24 and 26, which show them in part view, the inner surfaces of plunger 13 and suction plug 48 are flat. That is, the surface facing into pump chamber 31 on both components is flat and will tend to direct and increase the amplitude of primary hydraulic shock waves along parallel vectors within pump chamber 31.

Figure 25:
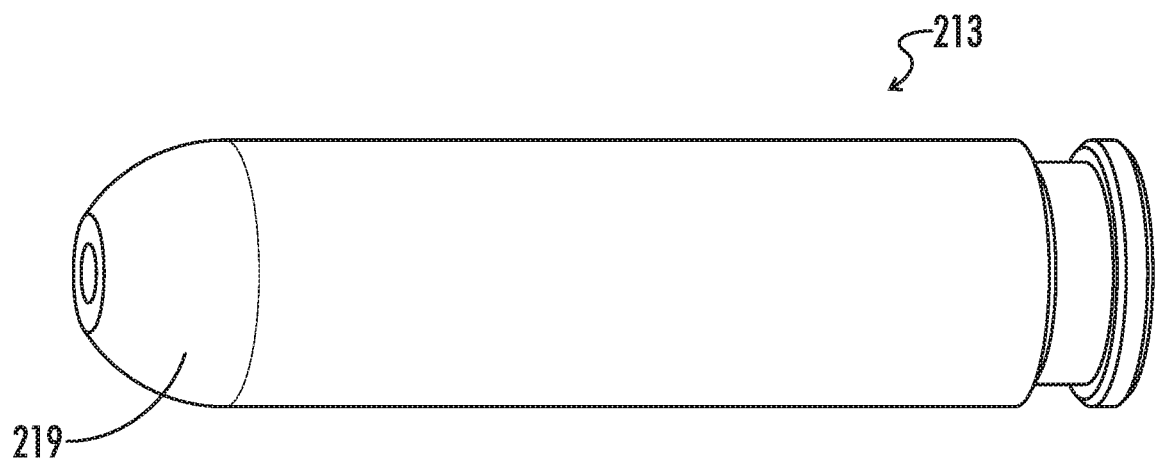
FIG. 25 is an isometric part view of a preferred embodiment 213 of the novel plungers, which plunger 213 is incorporated in novel fluid end 211 as shown in FIGS. 8-9.

Thus, novel fluid end 211 as shown in FIGS. 8-9 incorporates a preferred embodiment 213 of the novel plungers and a preferred embodiment 248 of the novel suction plugs. As best seen in the part view of FIG. 25, like plunger 13, plunger 213 has a body that has an overall cylindrical shape allowing it to be mounted within cylinders 230 in fluid end block 214. One end of plunger 213 is adapted for connection, for example, to a pony rod of a conventional power end such as power end 12. The other end 219 of plunger 213, the end that reciprocates in and out of pump chamber 231, is generally domed.

Similarly, suction plug 248 had a generally cylindrical body allowing plug 248 to be mounted in suction bores 246 of fluid end block 214. It external face is adapted for engagement by suction covers 24. It inner face 249, like chamber end 219 of plunger 213 is generally domed. As plunger 213 reciprocates into and out of pump chamber 231, therefore, primary hydraulic shock waves will be distributed and sprayed along many different vectors, thus tending to better distribute the stress throughout pump chamber 231.

It will be appreciated that the chamber end 219 of plunger 213 is truncated somewhat to allow the engagement of a puller tool, but it need not be. Likewise, while the chamber end 219 of plunger 213 otherwise is hemispherical and the chamber face 249 of suction plug 248 may be viewed as a truncated sphere, other geometries adapted to distribute primary shock waves may be used. Truncated ellipsoids and pyramids, especially highly faceted pyramids, for example, may be used if desired for the chamber end and face of the novel plungers and suction plugs. As in plunger 213, the nose of such alternate geometries may have an additional truncation to allow the engagement of a puller tool.

Figure 29:
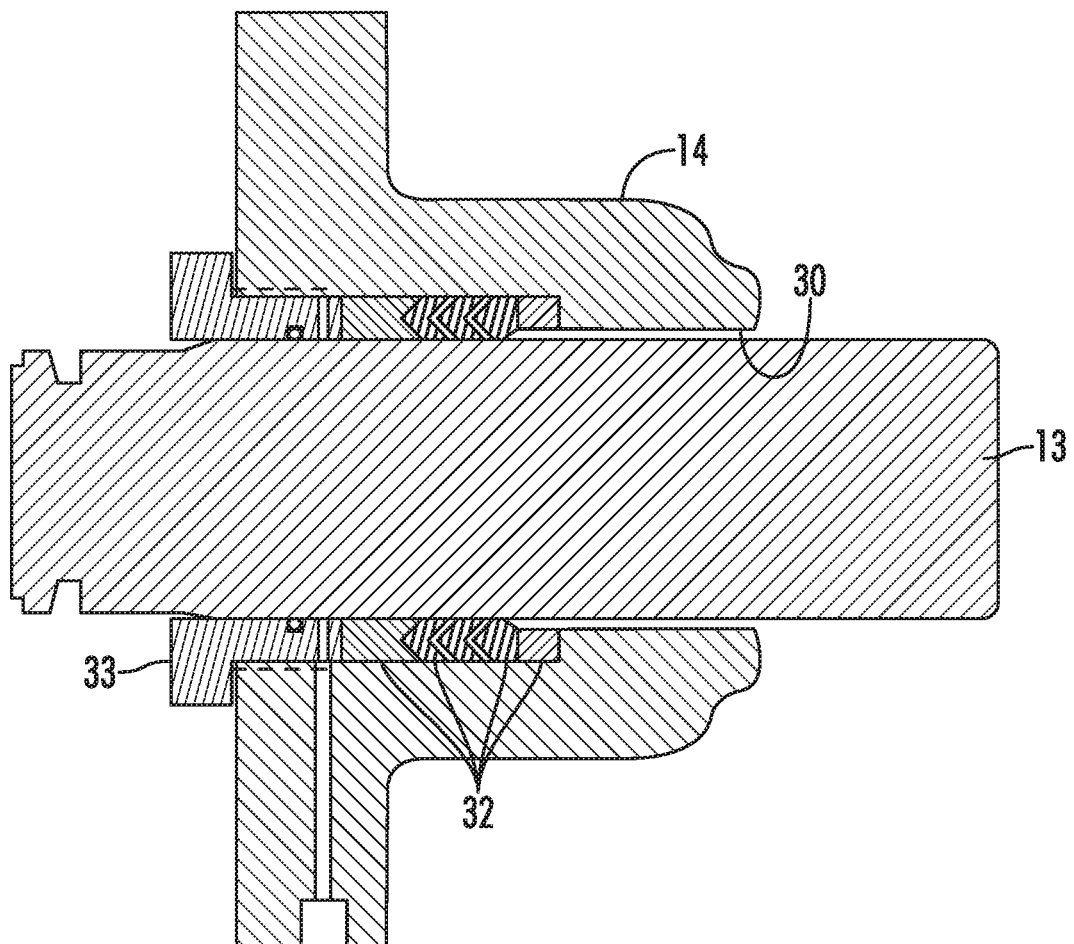
FIG. 29 (prior art) is an enlarged, cross-sectional view of a conventional plunger 13 and packing 32 similar to those used in conventional pump 10.

Other improvements to conventional pump designs such as pump 10 may be exemplified by first referring to FIG. 29. FIG. 29 shows a conventional design for mounting a plunger within a fluid end block which is disclosed in U.S. Pat. No. 8,784,081 to G. Blume and which is substantially identical to the design of pump 10 shown in FIGS. 1-5. As may be seen in FIG. 29, plunger 13 is mounted in cylinder 30 for reciprocating linear movement through packing 32. Packing 32 is loaded into an enlarged portion of cylinder 30, which may be referred to as a pocket 34. It typically includes a number of elastomeric, metallic, and/or composite components, and together those elements of packing 32 provide a fluid tight seal between cylinder 30 and reciprocating plunger 13. Packing 32 may be installed and removed from pocket 34 by unscrewing gland nut 33.

It will be appreciated that, like elsewhere in fluid end 11, those portions of fluid end block 14 are subject to extreme, cyclic stress caused both by reciprocation of plunger 13 and by fluid pressure within cylinder 30 and pump chamber 31. Certain components of packing 32 may be elastomeric and capable of absorbing and distributing such forces. Other components of packing 32, however, may be metallic, or composed of other relatively hard, less compressible material which transmit much of the cyclic forces through to pocket 34. As discussed above in reference to the portions of fluid end bock 14 around intake and discharge ports 41 and 44, such cyclic stress can create micro fracturing which may lead to costly rebuilding or scrapping of the entire block 14.

Figure 13A:
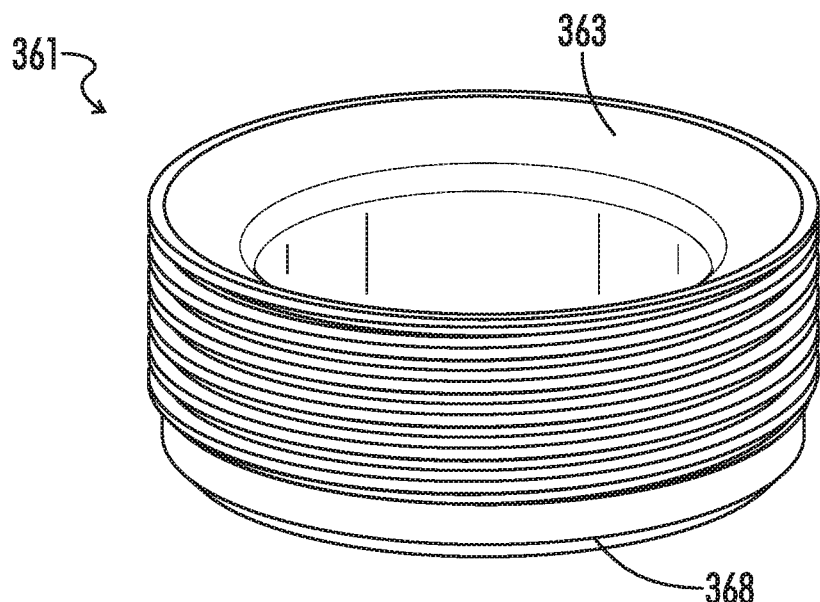
FIG. 13A is an isometric part view of another preferred embodiment 361 of the novel seats, which seat 361 in incorporated in valve 260d shown in FIG. 12.
Figure 13B:
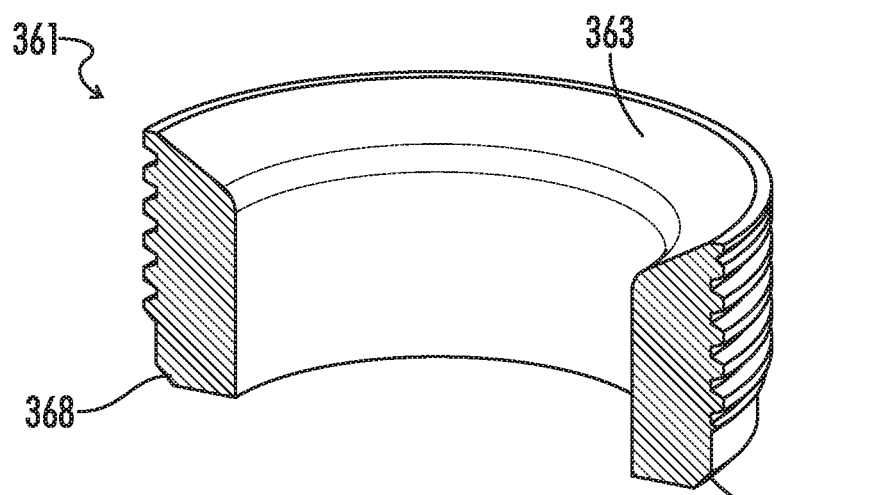
FIG. 13B is an isometric, cross-sectional part view of novel seat 361.
Figure 30:
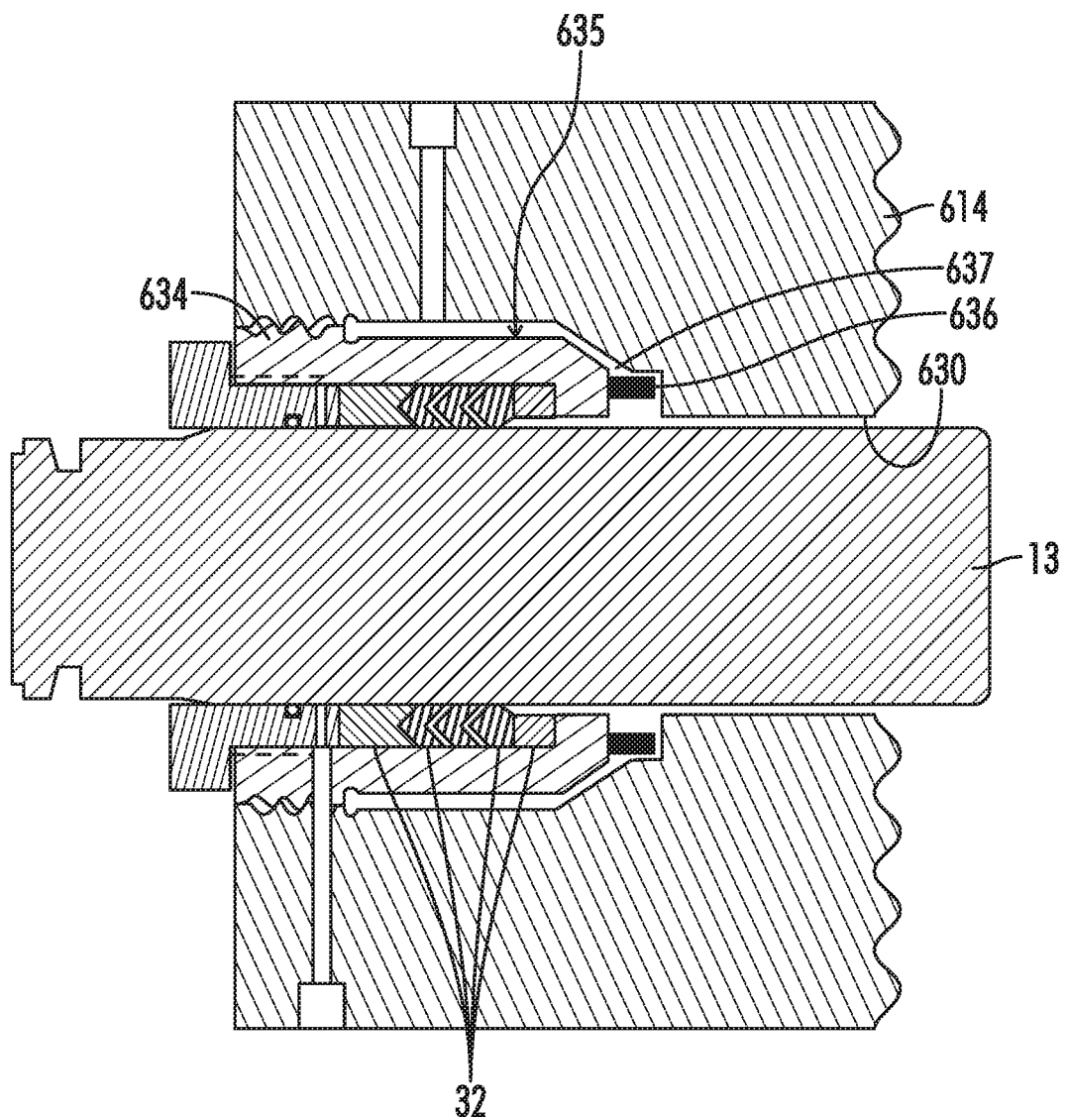
FIG. 30 is a cross-sectional view of plunger 13 and a novel packing assembly 635 which may be used in pumps such as pump 10.

Thus, another improvement to conventional fluid ends is exemplified in FIG. 13. FIG. 30 shows an improved packing assembly 635 which comprises conventional packing 32. Packing 32, however, is carried in an insert 634. Insert 634 is removably mounted within an enlarged diameter portion of the rear (left) end of cylinder 630 in fluid end block 614, for example, by a threaded connection or an interference fitting. Gland nut 33 is threaded into insert 634 to secure packing 32. Preferably, as shown in FIG. 30, the rear (left) end of insert 634 engages fluid end block 614 such that a small annular gap or tolerance exists between it and the enlarged portion of cylinder 630. Suitable annular seals, such as an elastomeric seal 636 and a metal seal 637, will be provided to seal the annular gap, and grease may be introduced therein.

It is believed that insert 634 will help isolate fluid end block 614 from cyclic stress created by operation of the pump. At the same time, packing 32 or insert 634 may be replaced easily in the event of unacceptable wear or damage.

Unfortunately, when a pump is operated at high power for extended periods of time, threaded nuts and covers designed to provide access to pump consumables may tend to loosen. The problem is exacerbated because many of the nuts and other threaded bodies have relatively large diameters. Some loosening may be tolerated, but excessive loosening has various consequences. At the least, it requires that operators constantly monitor and retighten all the many threaded nuts and covers on a pump. Otherwise, a threaded nut or cover may loosen to the point where fluid is discharged from the pump. It also is possible for a loosened nut or cover to come into contact with moving parts of the pump and cause significant damage to the pump.

Figure 31:
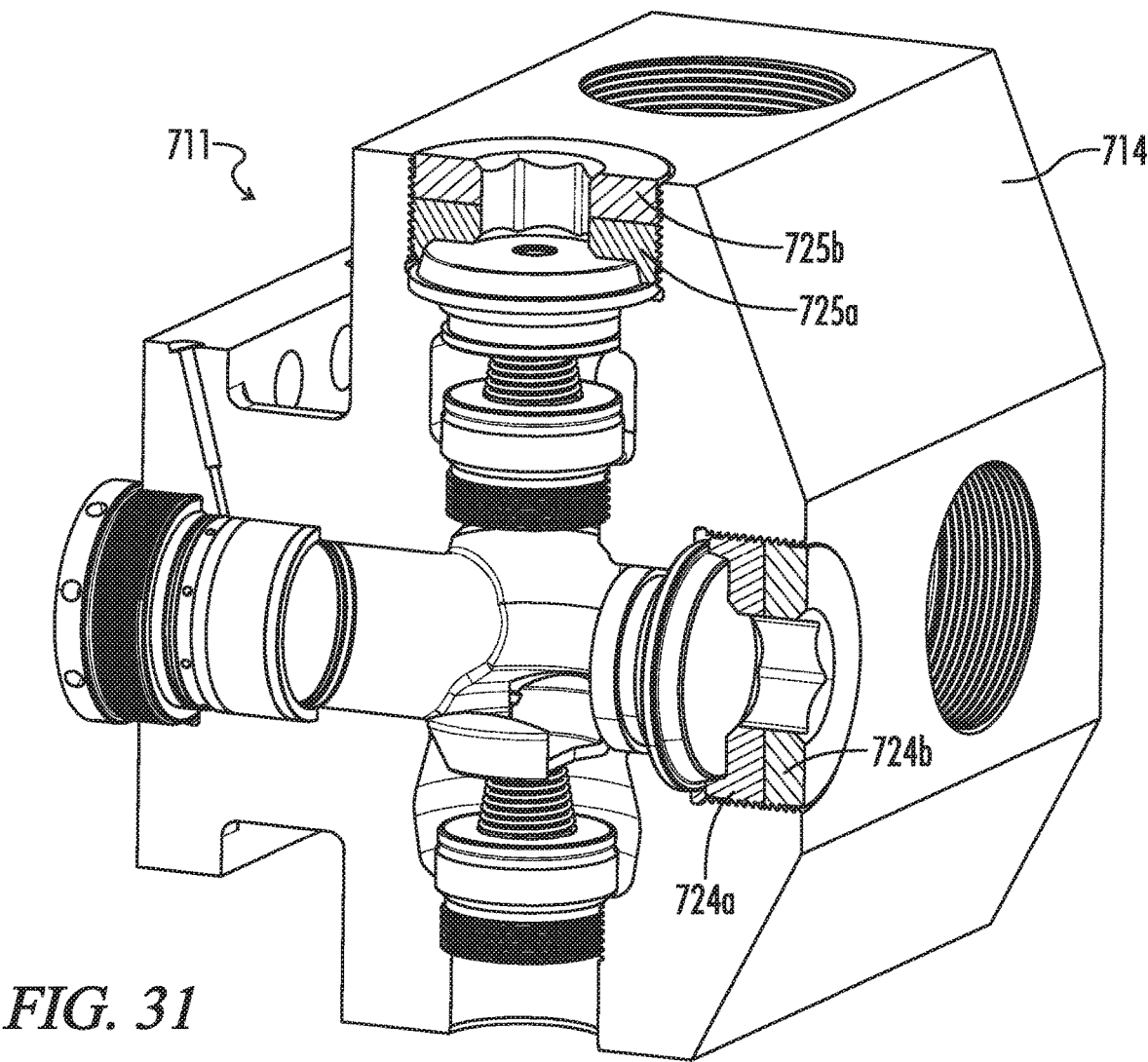
FIG. 31 is an isometric view of a conventional fluid end 714 similar to fluid end 14 in convention pump 10 shown in FIGS. 1-5 which is provided with novel threaded suction covers 724 and novel threaded valve covers 725.

Thus, other improvements to conventional fluid ends is exemplified in FIG. 31. FIG. 31 shows improved threaded suction covers 724 and improved threaded valve covers 725. Covers 724 and 725 are essentially identical, and thus, only threaded suction covers 724 will be further described. As may be seen in FIG. 31, suction cover 724 is an assembly of two threaded covers, inner cover 724a and outer cover 724b. Each cover 724a and 724b has features in common with conventional threaded covers. Their bodies are generally cylindrical and have threads around their circumference and a central, bottomed hole on their outer face. The outer circumference of suction bore 46 has mating threads so that covers 724a and 724b may be threaded therein. The bottomed hole in covers 724a and 724b has a hexagonal cross-section so that an Allen wrench may be inserted therein to tighten and loosen them. Spanner holes also are provided on their outer face to further assist in tightening and loosening covers 724a and 724b.

It will be appreciated that cover 724a will be threaded into suction bore 46 first until it bears on suction plug 48. Cover 724b then will be threaded into suction bore 46 until it bears on cover 724a. Further tightening of cover 724b will apply load to the bottom flanks of threads in cover 724a and load to the top flank of threads in cover 724b. Covers 724a and 724b, therefore, will be more resistant to loosening.

Figure 32:
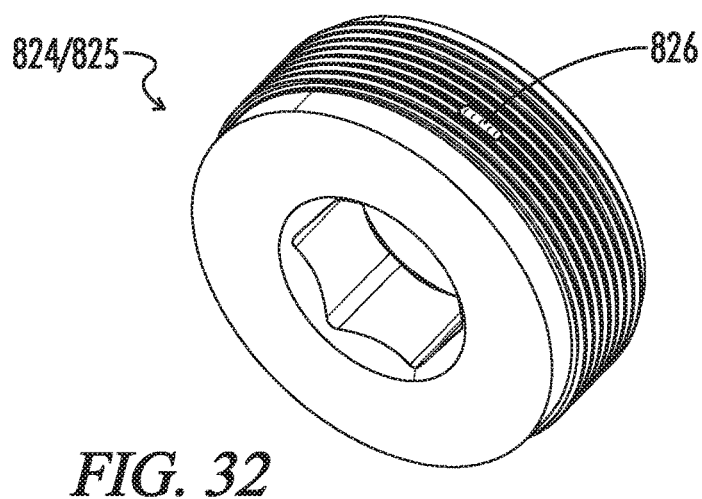
FIG. 32 is an isometric view of another novel threaded suction cover 824 or threaded valve cover 825.
Figure 33:
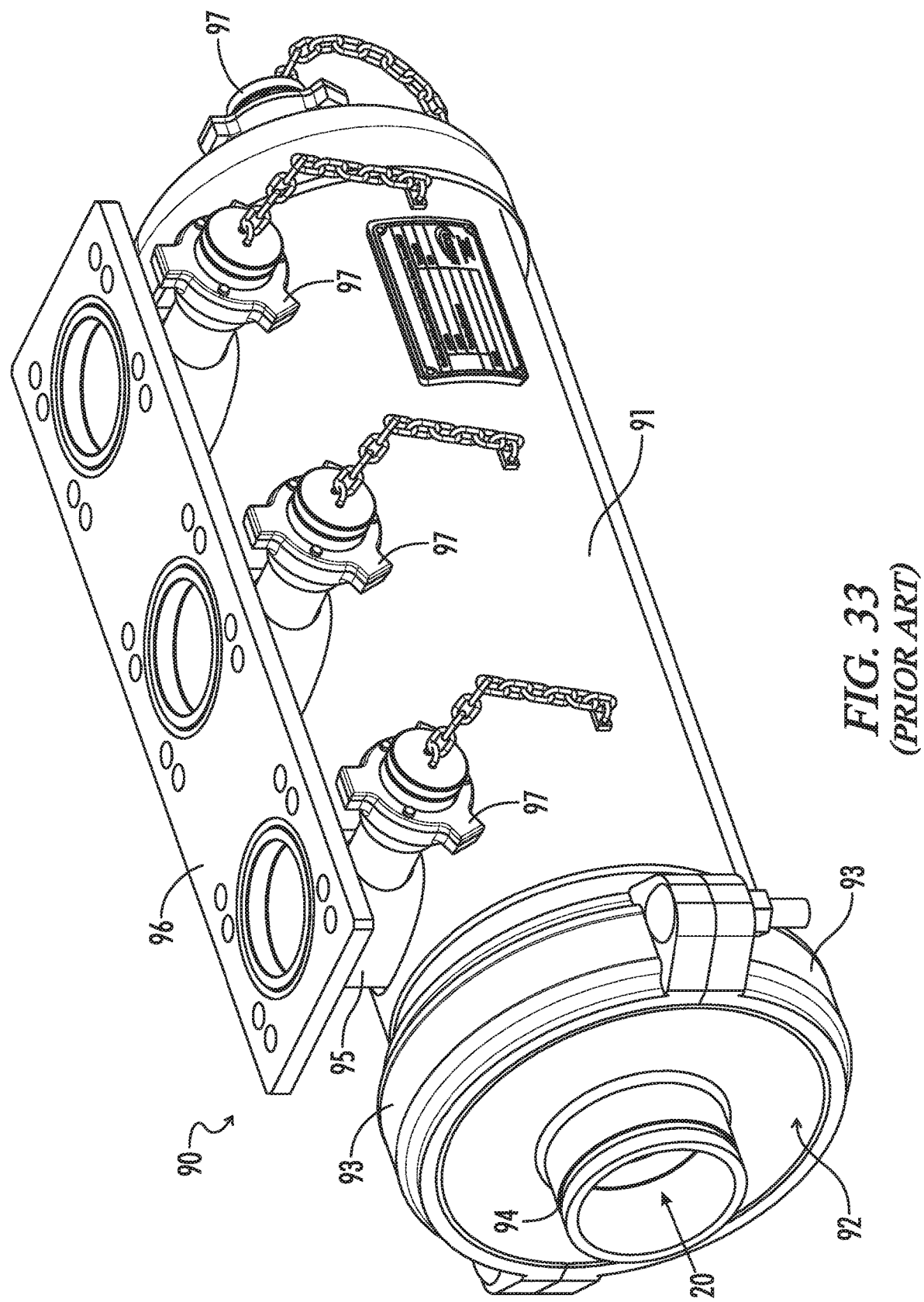
FIG. 33 (prior art) is an isometric view of a prior art suction manifold 90 such as may be used in pumps of the general design of conventional pump 10 shown in FIGS. 1-5.
Figure 34:
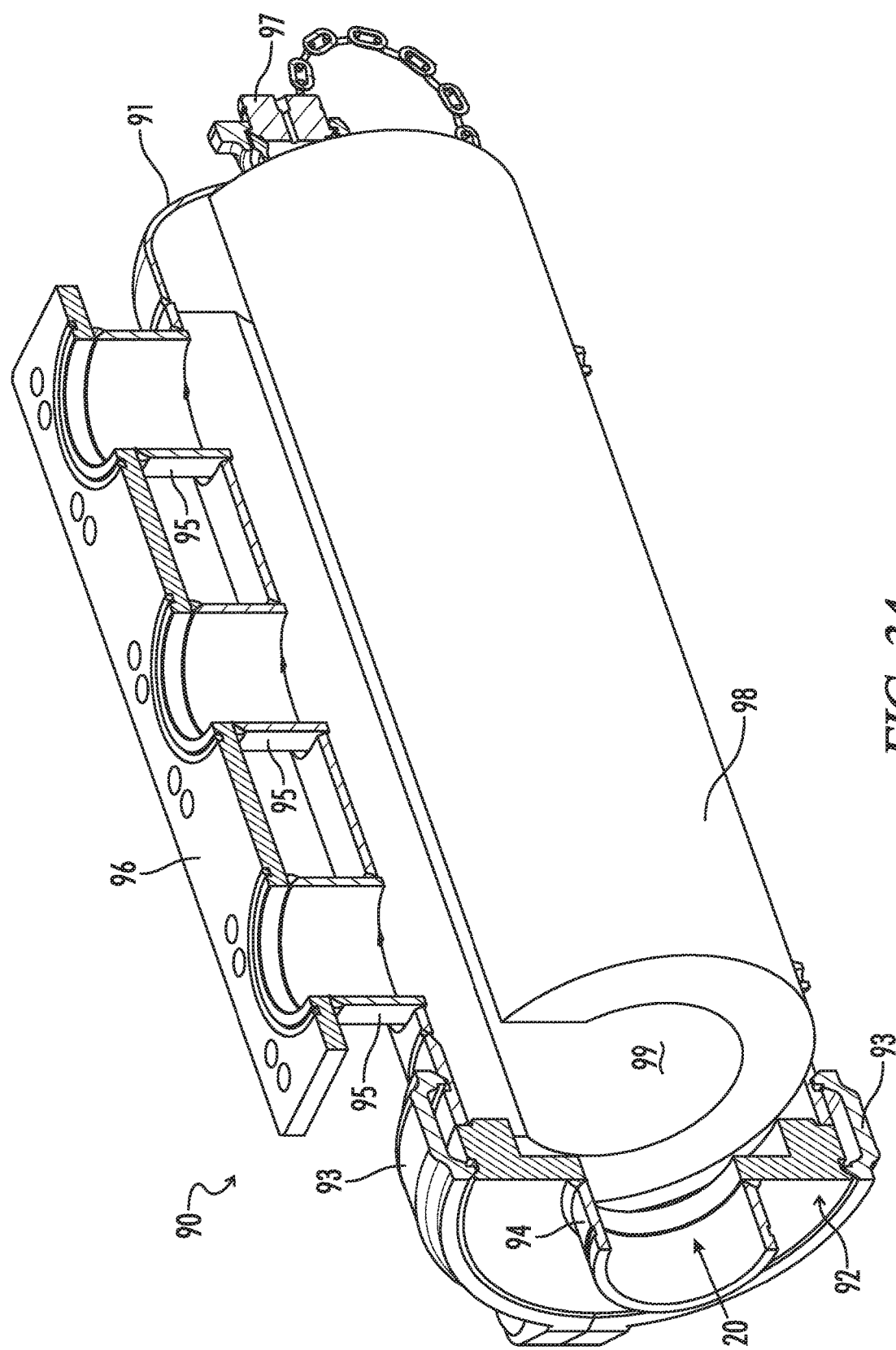
FIG. 34 (prior art) is an isometric, partial cross-sectional view of prior art suction manifold 90 shown in FIG. 33 showing a prior art liner 98 installed therein.

It also will be appreciated that due to the gritty, dirty nature of the fluid passing through frac pumps, the threads in suction bore 46 and valve bore 47 may become entrained with particulate matter that can interfere with installation and removal of covers 24 and 25. Bores 46 and 47 must be cleaned periodically to avoid such issues. Thus, another improvement is exemplified in FIG. 32. FIG. 32 shows a second improved suction cover 824. Cover 824 is provided with self-cleaning threads.

That is, an insert, such as a nylon insert 826, is set in a groove cut through the crest of a thread, preferably a thread somewhere in the mid-section of cover 824. Nylon insert 826 is sized such that when cover 824 is threaded into suction bore 46, it will be compressed slightly and substantially fill the root of the internal threads in suction bore 46. As cover 824 is threaded into suction bore 46, therefore, nylon insert 826 will scrape and clean the threads in suction bore 46, pushing any debris before it. Preferably, as shown in FIG. 15, the taper typically present on the leading thread is truncated or eliminated entirely so as to allow debris to be ejected more easily from cover 824. It will be appreciated that valve cover 25 or inner covers 724a and 725a may be provide with an insert to make those covers self-cleaning as well.

Other improvements to conventional pump designs may be appreciated by reference to FIGS. 33-36. Those figures illustrate a conventional suction manifold 90 that may be used, for example, with conventional pump 10 shown in FIGS. 1-5. Suction manifold 90 comprises a generally cylindrical vessel 91 that in large part defines the inlet manifolding chamber 42. One end of vessel 91 is closed while the other is generally open. A cap 92 may be releasably coupled over the open end of vessel 91 by a clamp assembly 93. A nipple 94 extends from the exterior of cap 92. Nipple 94 defines a passage that extends through cap 92 and provides the inlet 20 though which fluid may be drawn into vessel 91. Nipple 94 is adapted to allow a fluid line, such as a suction hose, to be connected to cap 92 by conventional hose connectors.

Fluid flowing into chamber 42 will be diverted through three flow tubes 95 extending upwardly from the top of vessel 91. Flow tubes 95 terminate at a plate 96. Plate 96 allows suction manifold 90 to be connected to fluid end block 14 by threaded connectors. When assembled to fluid end block 14, flow tubes 95 will discharge fluid into inlet ports 41 of each pump unit. As may be seen in FIG. 33, suction manifold 90 also is provided with various flush ports 97 by which accumulated sediment may be removed.

As noted previously, the hydraulic pressure of fluid flowing through conventional pumps such as pump 10 shown in FIGS. 1-5 is not constant. It fluctuates significantly as each plunger 13 draws in and discharges fluid from pump cavities 31. In particular, fluid flowing through suction manifold 42 into inlet ports 41 accelerates and decelerates rapidly as valves 40 and 43 of the pumping units open and close. That change in velocity causes significant pressure fluctuations within manifold 42 that can induce cyclic stress throughout pump 10. Synchronization of the pumping units helps to minimize such fluctuations, but cannot do so entirely.

In an attempt to address such problems, suction manifolds have been provided with resilient liners. Conventional suction manifold 90, for example, is provided with a resilient liner 98. Liner 98 is substantially identical to the liners disclosed in U.S. Pat. No. 7,621,728 to J. Miller. It is fabricated from a resilient material, such as cured natural rubber, synthetic rubber or a flexible polymer which has been processed with a nitrogen based foaming agent such as Celogen®. The resiliency of liner 98 helps to absorb hydraulic pressure fluctuations in manifold 90 and to prevent those pressure fluctuations from being transmitted through fluid end 14.

Figure 35:
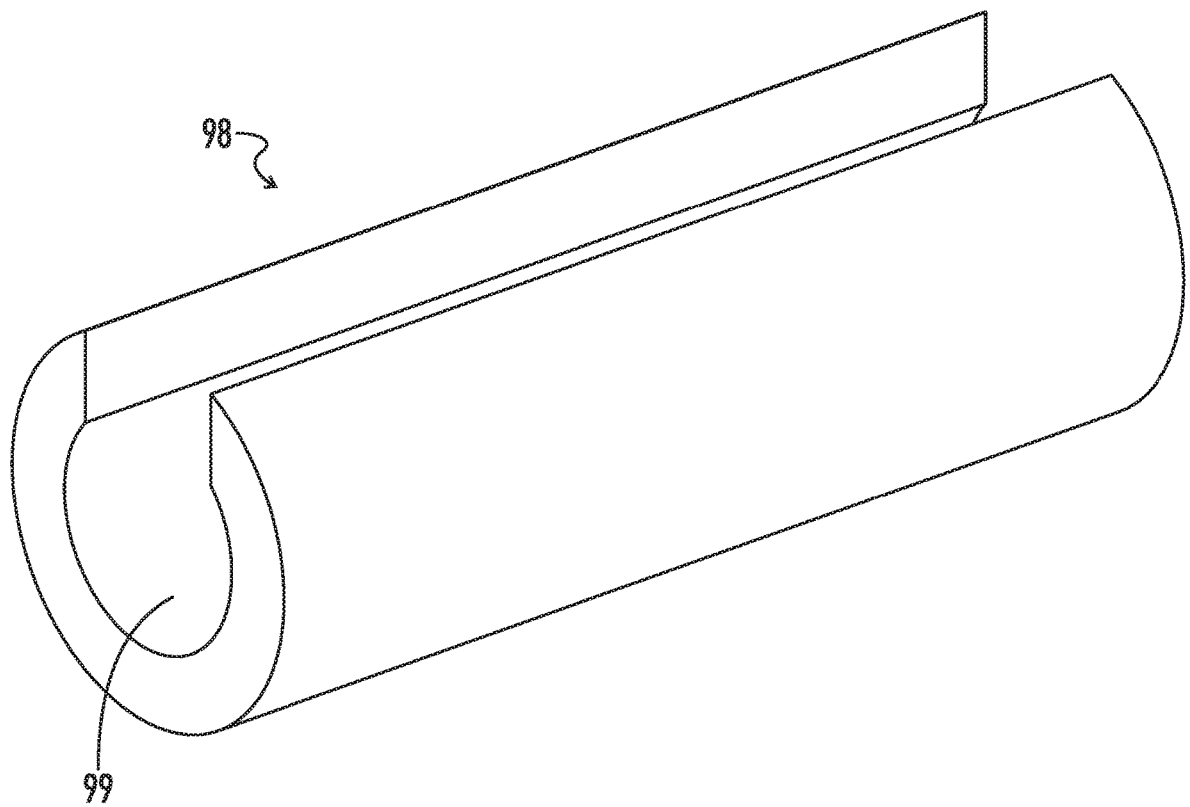
FIG. 35 (prior art) is an isometric, part view of prior art liner 98.
Figure 36:
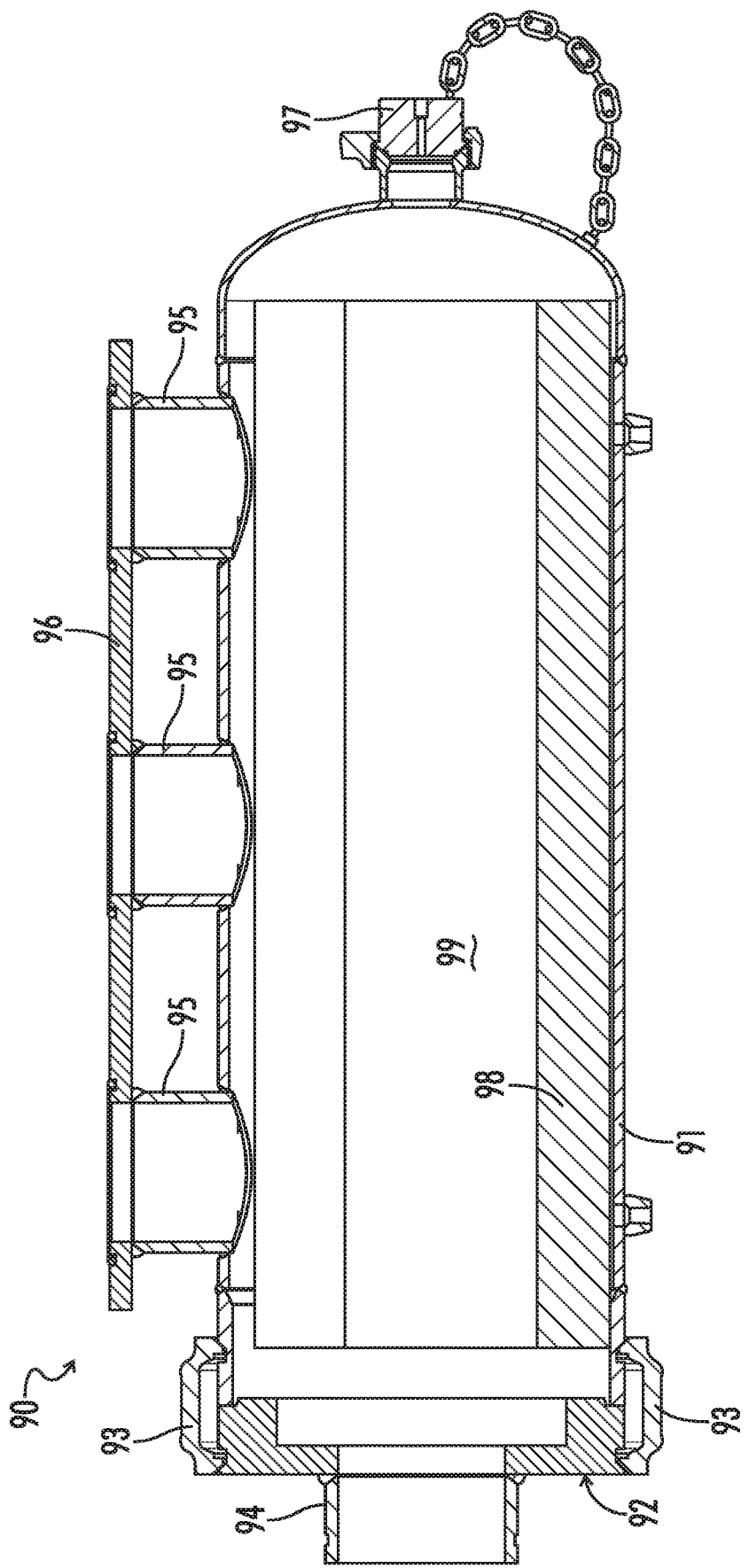
FIG. 36 (prior art) is a cross-sectional view of prior art suction manifold 90 shown in FIG. 33.

As best seen in FIGS. 35-35, liner 98 has a generally tubular body having a relatively narrow lateral slot 99 extending through and along its upper surface. Slot 99 will allow fluid flowing through liner 98 to reach flow tubes 94. The thickness of the liner walls, relative to the radius of the manifold, is relatively small, approximately one-third thereof. Importantly, however, it will be noted that liner 98 has a uniform internal diameter and thickness along its length and across its cross-section.

Given that the cross-sectional area of the flow path through liner 98 and vessel 91 is essentially constant, fluid may not be distributed equally among flow tubes 95 and inlet ports 41. Fluid will tend to be supplied preferentially to the upstream ports 41, that is, the ports 41 closest to inlet 20 of suction manifold 90. The pump units associated with upstream ports 41, therefore, will tend to cause larger fluctuations in pressure as their valves 40 and 43 open and close. Conversely, the downstream pump units with inlet ports 41 closer to the closed end of manifold 42 will cause smaller pressure fluctuations as they are replenished at lower rates. It will be appreciated, however, that in the event flow to the end or other downstream units is diminished to the point where those units cavitate, very high, very damaging pressure fluctuations may occur. Fluid velocity down manifold 42 also tends to slow as the upstream units are supplied preferentially, and that can cause particulates to settle on the bottom of manifold 42.

Flow through nipple 94 and cap 92 in large part will be directed into liner 98. A portion of that flow, however, will impinge on the forward face of liner 98. Particulates in the fluid can tend to be forced under and around liner 98. They can accumulate over time and reduce the effectiveness of liner 98. Moreover, after extended service, gas in the foam body of liner 98 tends to escape. Liner 98 tends to weaken and can be pushed back into vessel 42. Such effects can greatly diminish the ability of liner 98 to absorb hydraulic shock.

Figure 37:
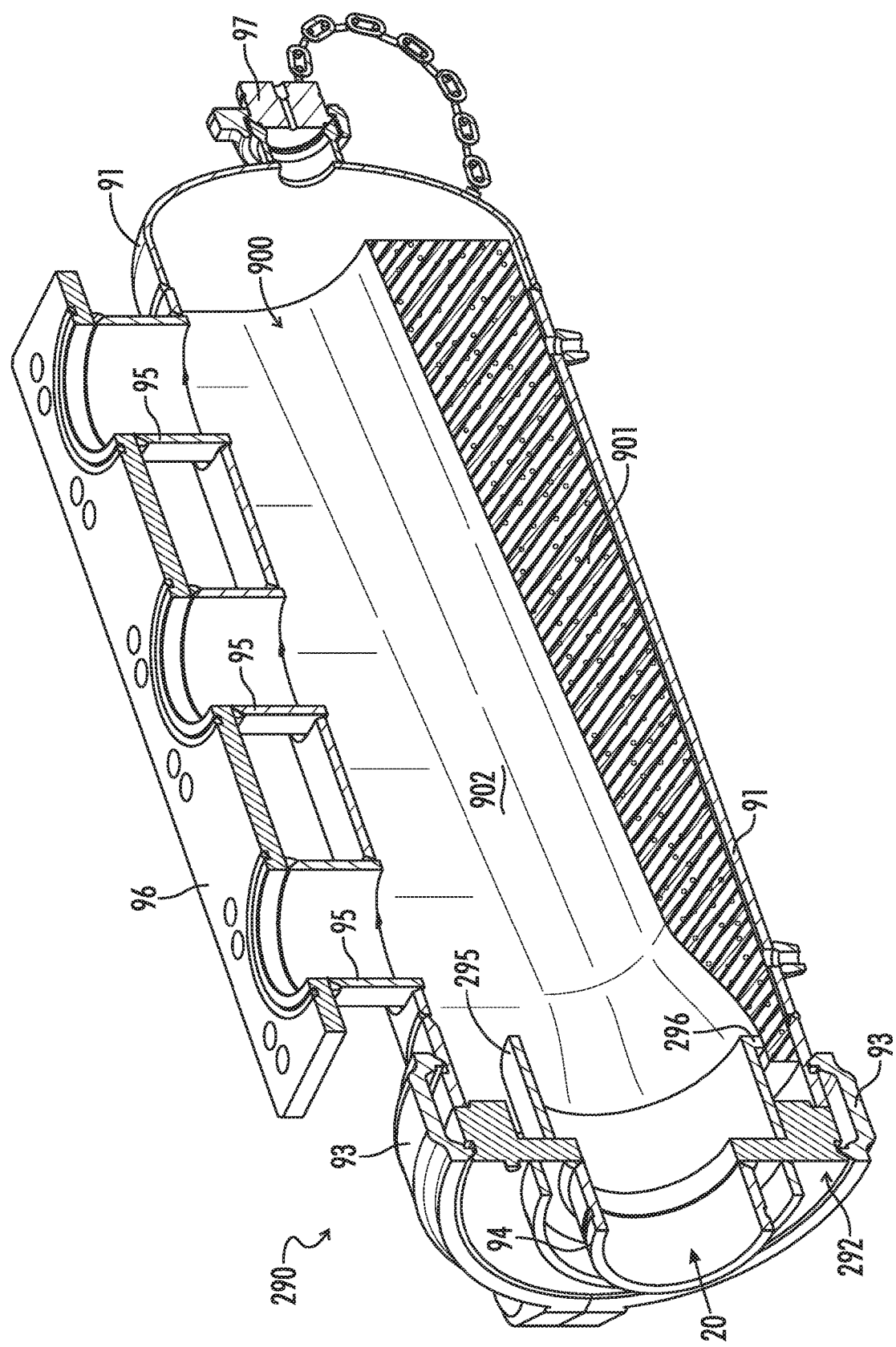
FIG. 37 is an isometric, axial cross-sectional view of a preferred suction manifold 290 that may be used, for example, with novel fluid end 211 and has a preferred embodiment 900 of the novel liners
Figure 38:
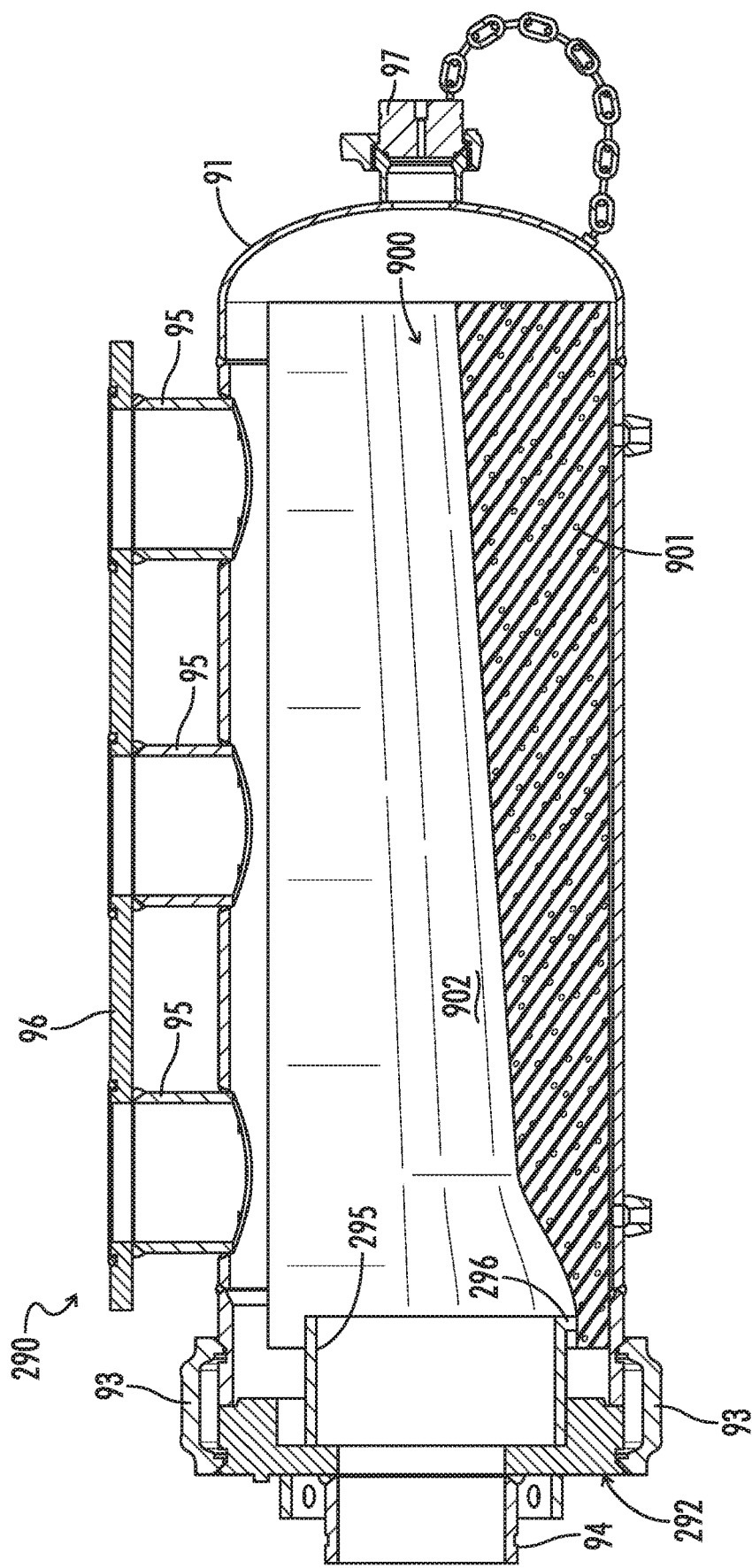
FIG. 38 is an axial cross-sectional view of novel suction manifold 290 shown in FIG. 37.
Figure 39:
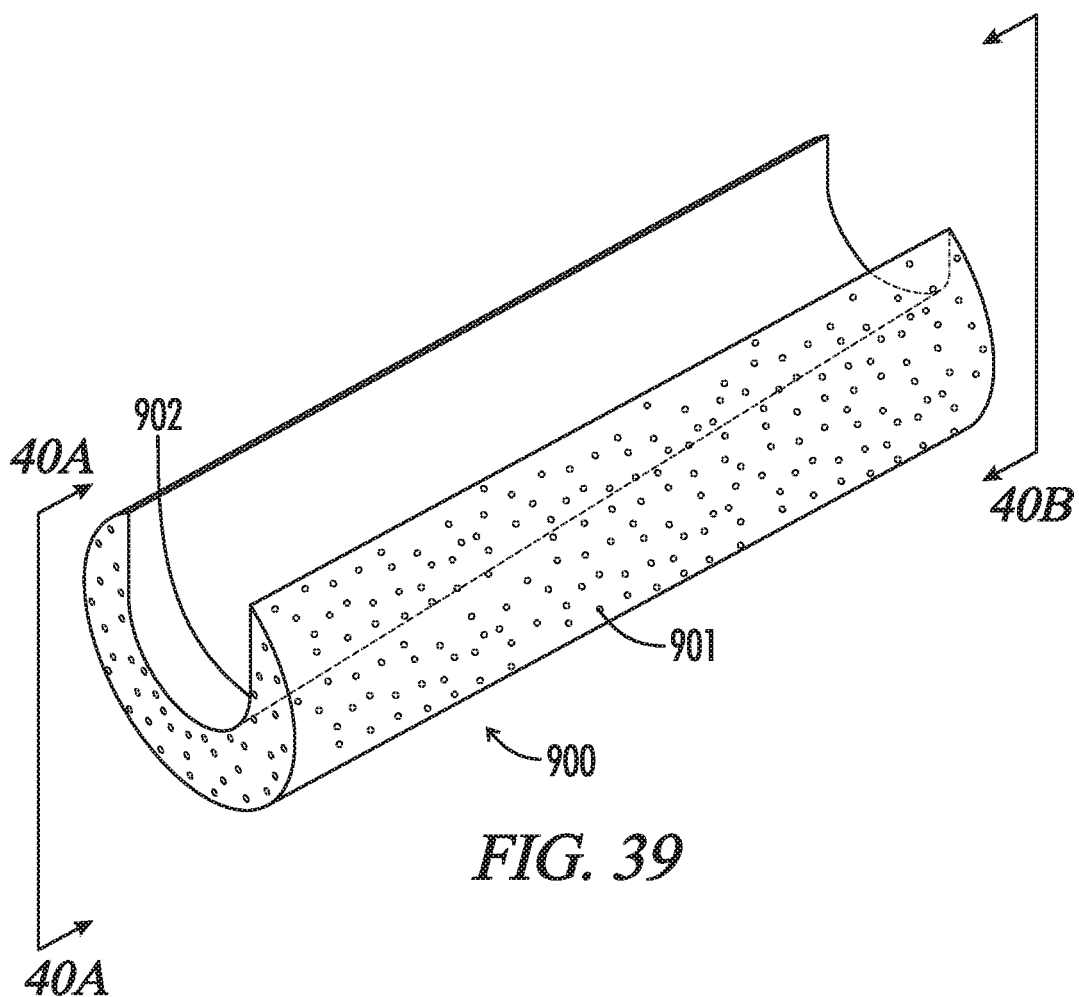
FIG. 39 is an isometric part view of novel liner 900.
Figures 40A, 40B:
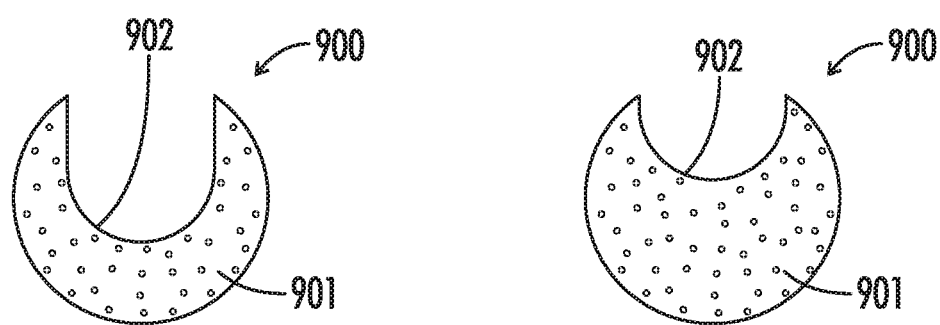
FIG. 40A is a transverse, cross-sectional view of liner 900 taken near the end of liner 900 which is disposed at the inlet end of manifold 290.
FIG. 40B is a transverse, cross-sectional view of liner 900 taken near the end of liner 900 which is disposed at the closed end of manifold 290.

Thus, novel fluid end 211 preferably incorporates a preferred embodiment 290 of the novel suction manifolds. Novel suction manifold 290 is shown in FIGS. 37-38. As may be seen therein, novel manifold 290 is similar in many respects to conventional manifold 90. It incorporates vessel 91 and flow tubes 94 for example. It may be assembled to fluid end block 214 by threaded connections extending through openings in plate 96. Manifold 290, however, incorporates an embodiment 292 of novel manifold caps and an embodiment 900 of novel manifold liners.

Manifold liner 900 is made of a compressible, resilient material and may be constructed generally in accordance with the Miller '728 patent. Liner 900, however, has been modified to help equalize fluid velocity through suction manifold 290 and to better minimize and absorb acceleration induced pressure variations caused by the opening and closing of valves 260s and 260d.

As will be appreciated readily from FIGS. 37-40, and in contrast to conventional liner 98, the thickness of novel liner 900 is tapered along its length. That is, liner 900 may be viewed as having a generally cylindrical compressible body 901 which fits closely within vessel 91. Body 901 together with the upper walls of vessel 91 define a flow path through manifold 290. The inner walls of vessel 91 being constant, it will be appreciated that the contours of that flow path will be determined largely by a channel 902 in body 901 of liner 900. Channel 902 extends laterally along the length of body 901 and is open at its top. Fluid thus can flow upward into flow tubes 94.

Importantly, however, the cross-sectional area of channel 902 is not constant as in prior art liner 98. It diminishes along the direction of flow through vessel 91, thus providing a diminishing flow path through suction manifold 290. For example, channel 902 has a generally rounded bottom. The depth of groove 902 decreases from one end—the end disposed at the open end of vessel 91—to the other end—the end disposed at the closed end of vessel 90. The decrease in depth may be linear, so as to provide a uniform, smooth taper from one end to the other, but is not necessarily so.

Channel 902 is not limited to the particular shape or dimensions illustrated. For example, the width of channel 902 may be diminished instead of or complementary to decreasing the depth of channel 902. Channel 902 also may be generally circular, giving body 901 a shape generally corresponding to that of an extruded, diminishing lune. The smaller, intersecting lune circle may provide the general shape for channel 902 and its center may be moved up, its diameter reduced, or both to provide a taper. Liner 900 also may simply be a beveled cylinder the bevel in effect providing a flow path of diminishing cross-section. As another option, body 901 may be provided with a bore of diminishing cross-sectional area, with laterally spaced openings extending radially from the bore to the periphery of the body. The openings will allow fluid to flow from the bore into the flow tube 94.

Liner 900 thus provides a flow path through suction manifold 290 that has a cross-sectional area that diminishes along the length of vessel 91. In conventional pumps, including those having a liner as disclosed in Miller '728, the internal diameter of manifold 42 is essentially constant. In contrast to such uniform-diameter manifolds where fluid flow tends to slow, the taper in liner 900 will help maintain a more constant fluid velocity through suction manifold 290. That will help reduce the amount of particulate settling to the bottom of suction manifold 290. Moreover, since the reduction in cross-section is provided by compressible body 901, in the event of cavitation, body 901 will be thicker, and liner 900 will provide the greatest volume of compressible, shock-absorbing gas near the downstream pump units those units where cavitation is most likely to occur and is likely to produce the most severe pressure shocks.

Liner 900 may be constructed generally in accordance with the liners disclosed in Miller '728. Accordingly, liner 900 preferably is fabricated from a resilient material, such as cured natural rubber, synthetic rubber or a flexible polymer which has been processed with a foaming agent. Suitable foaming agents include Celogen® and may include other azodicarbonamides or other nitrogen generating foaming agents. Foaming agents which generate other gases also may be suitable. Nitrogen-foamed nitrile butadiene rubber (NBR) are especially preferred materials from which liner 900 may be fabricated.

The foamed resilient material preferably is a closed-cell foam. As pressure increases within manifold 42, therefore, gas within liner 900 will compress and increase the effective volume of manifold 42, thereby decreasing the hydraulic pressure. After the pressure spike dissipates, the gas will rapidly expand. That process of compression and expansion is rapid and may be repeated over many thousands of cycles without significant diminution of its performance. Liner 900 also is inexpensive and requires no maintenance other than periodic replacement.

Figure 41:
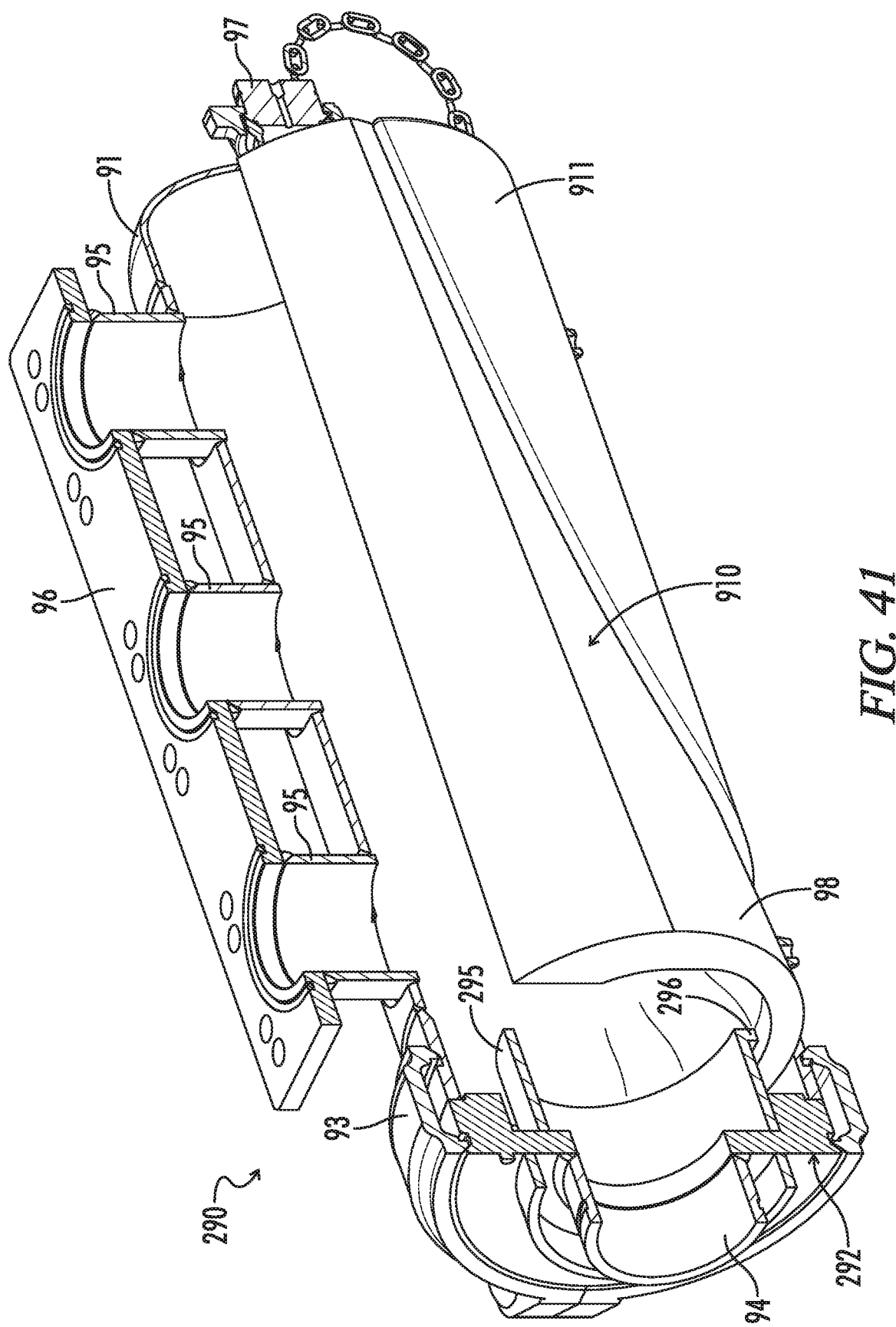
FIG. 41 is an isometric, axial partial cross-sectional view of suction manifold 290 shown in FIG. 38, except that it incorporates another preferred embodiment 910 of the novel liners.
Figure 42:
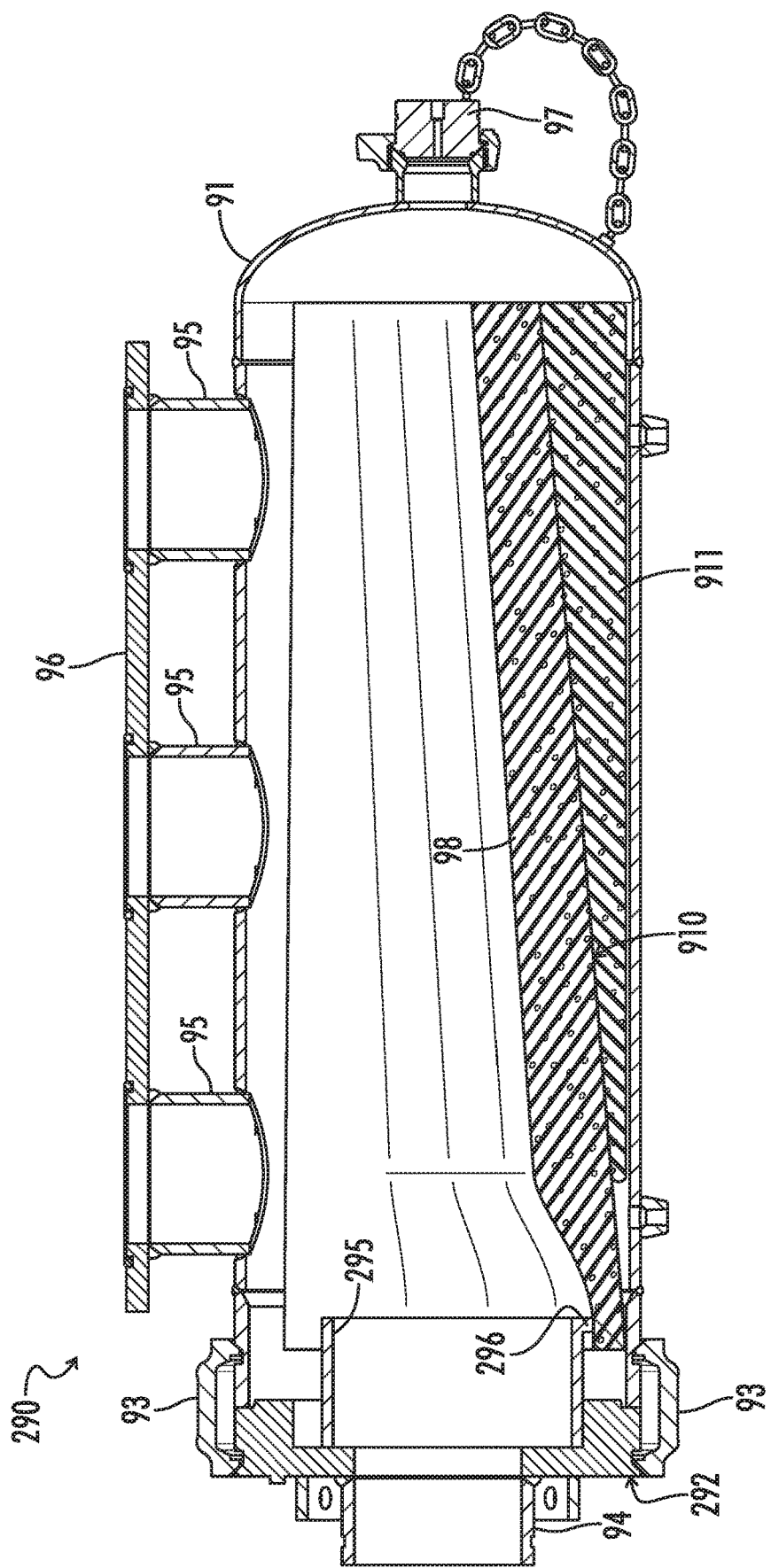
FIG. 42 is an axial cross-sectional view of suction manifold 290 with novel liner 910 as shown in FIG. 41.
Figure 43:
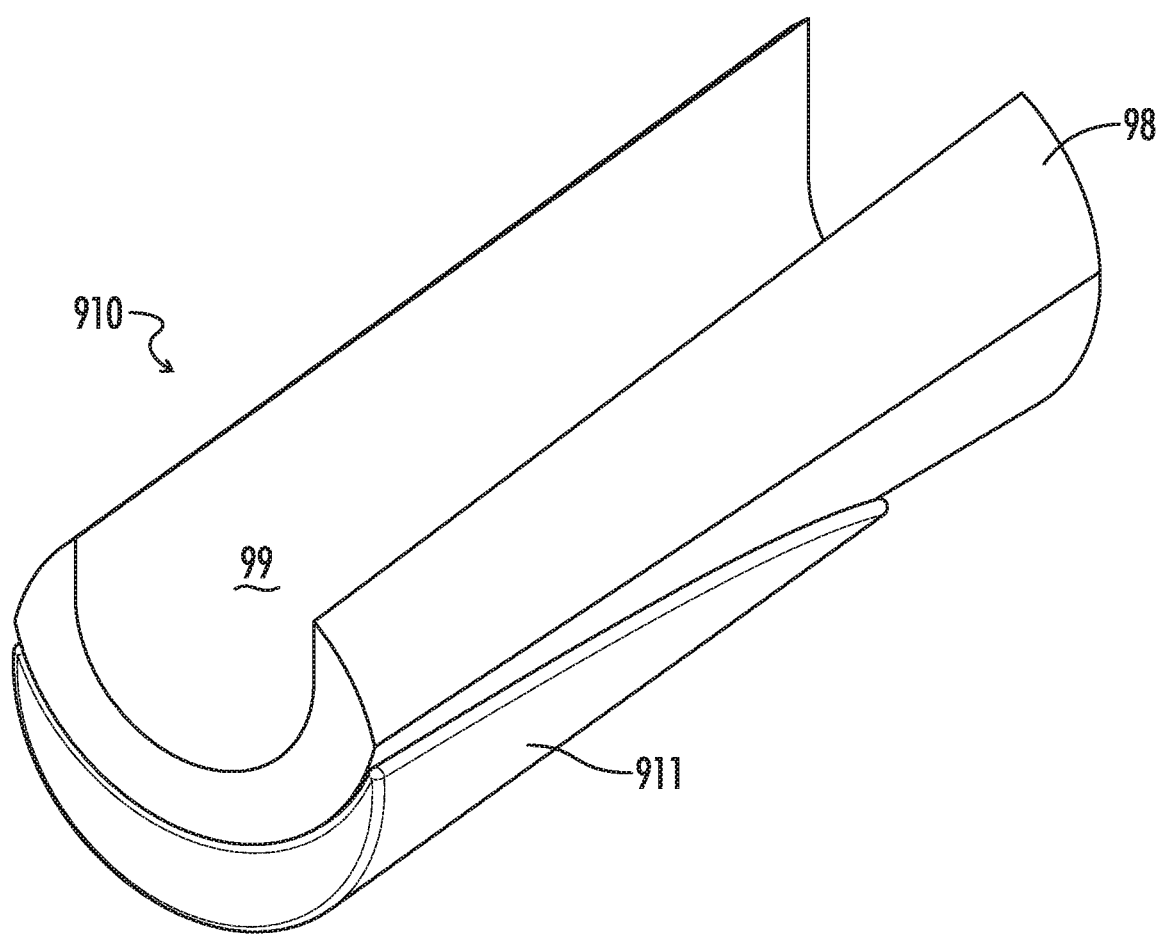
FIG. 43 is an isometric part view of novel liner 910 shown in FIG. 41
Figure 44A:
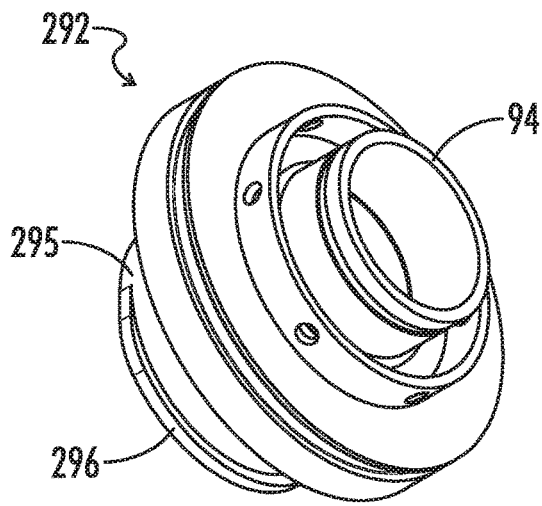
FIG. 44A is an isometric part view, taken generally from the outside, of a preferred embodiment 292 of the novel chamber caps, which chamber cap 292 is part of suction manifold 290 shown in FIG. 37.
Figure 44B:
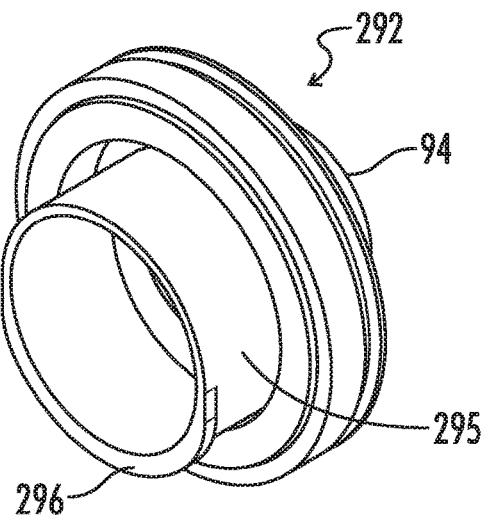
FIG. 44B is an isometric part view, taken generally from the inside, of novel chamber cap 292.
Figure 44C:
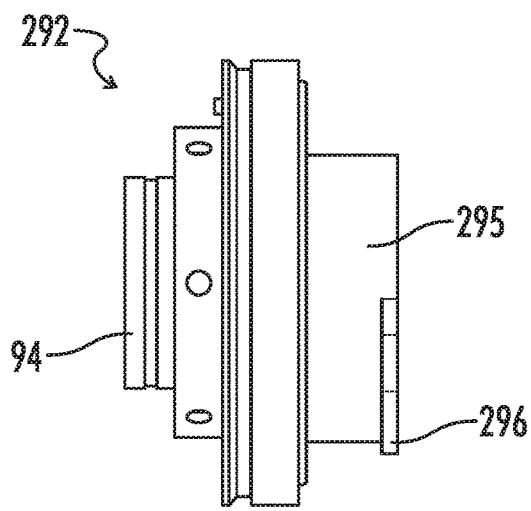
FIG. 44C is an inside elevational part view of novel chamber cap 292.
Figure 44D:
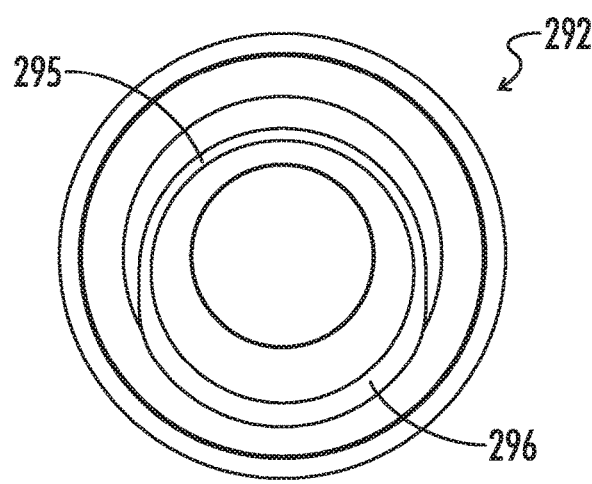
FIG. 44D is a side elevational part view of novel chamber cap 292.

Similar benefits may be obtained by another preferred embodiment 910 of the preferred liners shown in FIGS. 41-43. As may be seen therein, liner 910 is an assembly of, for example, prior art liner 98 and a wedge or tapered shim 911. Liner 98, as previously noted, provides an essentially constant flow path. When installed in suction manifold 290, as shown in FIGS. 41-42, however, shim 911 may be placed under liner 98 at the far end of vessel 91. It will force the distal end of liner 98 upward, thus forcing liner 98, which otherwise has a uniform channel, to provide a gradual reduction in the cross-section of the flow path through vessel 91. Shim 911 may be formed of relatively incompressible material, but preferably it will be fabricated from the same resilient materials as used in liners 98 and 900. It also will be appreciated that similar shims may be used with liners already having a gradual reduction in the cross-section of the flow path.

Cap 292 provides additional improvements to suction manifold 290. Its overall configuration is similar to prior art cap 92, and it may be secured to vessel 91 by clamps 93 in the same manner. It also has a nipple 94 on its exterior side that provides an inlet 20 and to which a suction hose may be connected. As best appreciated from the part views of FIG. 44, however, cap 292 has a tubular flow guide 295 extending from its interior side. Flow guide 295 is provided with a semi-annular boss 296 extending radially outward from its terminus.

As best appreciated from FIGS. 37-38, when cap 292 is installed, flow guide 295 will extend into channel 902 of liner 900. During installation, cap 292 preferably will be oriented such that boss 296 is positioned toward the upper side of vessel 291 and within the open top of liner 900. Once flow guide 295 has been fully inserted into liner 900, cap 292 will be rotated such that boss 296 engages the bottom of liner 900, clamping and holding down that end of liner 900.

Boss 296 may be provided with teeth or similar features to enhance the grip of nub 296 on liner 900. Similarly, other radial enlargements at or near the terminus of a flow guide may be provided, such as a series of discrete nubs or other protuberances. In any event, it will be appreciated that flow guide 295 of cap 292 in the first place will direct fluid into channel 902 of liner 900 without any impingement on the forward face of liner 900. Particulates are less likely to flow and accumulate under liner 900, and liner 900 is less likely to be pushed back into vessel 91. Moreover, nub 296 on flow tube 295 will help secure liner 900 in place.

It will be appreciated, therefore, the various improvements disclosed herein offer important benefits. Any number of components are susceptible to wear and failure, some of which must be replaced with regularity. Cracking and wearing of the fluid end block of frac pumps, however, is the costliest repair issue faced by pump owners, both in terms of actual repair costs and revenue lost while a pump is out of service. Typically, the entire block is scrapped, and the fluid end must be rebuilt with a new block. Fluid ends incorporating seat inserts, such as inserts 168, threaded seats such as seats 261 and 361, port inserts such as inserts 519 in fluid end block 514, improved packing assemblies such as packing assemblies 635 in fluid end block 614, and improved plungers and suction plugs such as plunger 216 and suction plug 248 may offer an opportunity to extend the service life of a fluid end block by diminishing the stress to which it is subjected and by providing relatively easy and inexpensive opportunities to rebuild and recondition the block. Improved liners in their suction manifolds, such as liner 900, may diminish the cyclic stress to which fluid end blocks and other components are subject, thus extending their service life.

Valves and packings of frac pumps are consumables which necessarily must be replaced from time to time. The improved valves, however, offer the prospect of longer valve life, easier rebuilding, and less frequent replacement. Fluid ends incorporating novel suction valve retainers such as retainer 280 may avoid potentially catastrophic dislodgment of suction valves. The novel threaded covers also offer more reliable operation and easier maintenance.

In general, the various components of the novel fluid ends may be fabricated by methods and from materials commonly used in manufacturing conventional fluid ends for frac pumps. Given the extreme stress and the corrosive and abrasive fluids to which they are exposed, suitable materials will be hard, strong, and durable. For example, excepting elastomeric seals, packings, and the like, the components of novel fluid ends may be fabricated from 4130 and 4140 chromoly steel or from somewhat harder, stronger steel such as 4130M7, high end nickel alloys, and stainless steel. The components may be made by any number of conventional techniques, but typically and in large part will be made by forging, extruding, or mold casting a blank part and then machining the required features into the part.

It also will be appreciated that various improvements to fluid ends in general, and to the valves, covers, packings, and manifolds incorporated therein, have been described herein. Preferably, the novel pumps will incorporate all or most such improvements. At the same time, however, the invention encompasses embodiments where only one, or fewer than all such improvements are incorporated. The novel pumps also will incorporate various features of conventional frac pumps and fluid ends. For example, the exemplified valves have been described as incorporating various seals, seats, and packing elements. Other conventional features, however, may be incorporated into the novel valves as will be readily appreciated by workers in the art having the benefit of this disclosure.

Similarly, the novel pumps have been described in the context of frac systems. While frac systems in particular and the oil and gas industry in general rely on high-pressure pumps, the novel pumps are not limited to such applications or industries. Likewise, the improvements disclosed herein are not limited in their application to the specific, exemplified conventional pump designs. Suffice it to say that the improvements and novel pumps disclosed herein have wide applicability wherever high-pressure pumps have be applied conventionally.

While this invention has been disclosed and discussed primarily in terms of specific embodiments thereof, it is not intended to be limited thereto. Other modifications and embodiments will be apparent to the worker in the art.

What is claimed is:

1. A liner for a suction manifold adapted to provide fluid to a plurality of intake ports of a multi-unit reciprocating pump, said liner comprising:
   (a) a compressible, resilient body carried within said suction manifold;
   (b) said body having a lateral slot running through its upper portion defining, when said body is installed in said suction manifold, a generally U-shaped channel, said channel extending through said manifold and adapted to convey fluid from an inlet of said suction manifold to said intake ports of said pump units; and
   (c) wherein the cross-sectional area of said channel diminishes along the direction of flow through said channel.

2. The liner of claim 1, wherein said body is fabricated from a closed-cell foamed material.

3. The liner of claim 2, wherein said body is fabricated from a foamed nitrile butadiene rubber.

4. A suction manifold for a multi-unit reciprocating pump having a plurality of intake ports, said suction manifold comprising the liner of claim 2.

5. The liner of claim 2, wherein said body comprises a shape generally corresponding to that of an extruded, diminishing lune.

6. A suction manifold for a multi-unit reciprocating pump having a plurality of intake ports, said suction manifold comprising the liner of claim 5.

7. A multi-unit reciprocating pump having a plurality of intake ports and a suction manifold adapted to provide fluid to said intake ports, said pump comprising the liner of claim 5 installed in said manifold.

8. The liner of claim 1, wherein said body comprises a shape generally corresponding to that of an extruded, diminishing lune.

9. The liner of claim 1, wherein the depth of said channel diminishes along the direction of flow through said channel.

10. The liner of claim 9, wherein the width of said channel diminishes along the direction of flow through said channel.

11. The liner of claim 1, wherein the width of said channel diminishes along the direction of flow through said channel.

12. A suction manifold for a multi-unit reciprocating pump having a plurality of intake ports, said suction manifold comprising the liner of claim 1.

13. A multi-unit reciprocating pump having a plurality of intake ports and a suction manifold adapted to provide fluid to said intake ports, said pump comprising the liner of claim 1 installed in said manifold.

14. The pump of claim 13, wherein said pump comprises a tapered shim installed in said manifold and supporting said compressible body under its distal end, wherein said shim is effective to provide said compressible body with said diminution of cross-sectional area.

15. A suction manifold adapted to provide fluid to a plurality of intake ports of a multi-unit reciprocating pump, said suction manifold comprising:
   (a) a manifold having an inlet;
   (b) a liner carried with said manifold, said liner comprising a compressible, resilient body defining a channel extending through said manifold and adapted to convey fluid from said inlet of said manifold to said intake ports of said pump units; and
   (c) a cap adapted for coupling to said inlet and to a suction line, said cap comprising a passage and a flow guide extending inwardly into said channel of said compressible body, wherein said flow guide comprises a radial enlargement adapted to engage a portion of said compressible body.

16. The suction manifold of claim 15, wherein said radial enlargement comprises a boss extending radially outward from said flow guide, said boss adapted to engage a portion of said compressible body by clamping and holding down said portion of said compressible body.

17. A multi-unit reciprocating pump having a plurality of intake ports, said pump comprising the suction manifold of claim 15.

18. A suction manifold for a multi-unit reciprocating pump having a plurality of intake ports, said suction manifold comprising:
   (a) an inlet;
   (b) a liner comprising a compressible resilient body mounted within said suction manifold, said body defining a channel extending through said manifold and adapted to convey fluid from said inlet of said suction manifold to said intake ports of said pump units; and
   (c) a tapered shim installed in said manifold and supporting said compressible body of said liner under its distal end, wherein said shim is configured to provide said compressible body with a diminution of the cross-section area of said channel along the direction of flow through said channel.

19. The suction manifold of claim 18, wherein said compressible body is generally cylindrical and has a lateral slot running through its upper portion defining said channel and providing said channel with a generally U-shaped cross-section.

20. A multi-unit reciprocating pump having a plurality of intake ports, said pump comprising the suction manifold of claim 18.

* * * * *